(12) United States Patent
Patzwald et al.

(10) Patent No.: US 7,400,415 B2
(45) Date of Patent: Jul. 15, 2008

(54) OPERATOR INTERFACE APPARATUS AND METHOD FOR DISPLACEMENT TRANSDUCER WITH SELECTABLE DETECTOR AREA

(75) Inventors: Andrew Michael Patzwald, Kirkland, WA (US); Jason Stuart Hartman, Bothell, WA (US); Stephen Gareth Alexander Smele, Seattle, WA (US); Benjamin Keith Jones, Seattle, WA (US)

(73) Assignee: Mitutoyo Corporation, Kawasaki (JP)

( * ) Notice: Subject to any disclaimer, the term of this patent is extended or adjusted under 35 U.S.C. 154(b) by 520 days.

(21) Appl. No.: 11/079,175

(22) Filed: Mar. 15, 2005

(65) Prior Publication Data

US 2006/0229744 A1    Oct. 12, 2006

(51) Int. Cl.
*G01B 11/14* (2006.01)
(52) U.S. Cl. ...................... 356/614; 356/622
(58) Field of Classification Search ......... 356/614–623, 356/450–521
See application file for complete search history.

(56) References Cited

U.S. PATENT DOCUMENTS

| | | | |
|---|---|---|---|
| 6,642,506 B1 | 11/2003 | Nahum et al. | |
| 7,161,682 B2 * | 1/2007 | Xie et al. | 356/520 |
| 2002/0105656 A1 | 8/2002 | Nahum et al. | |
| 2003/0026457 A1 | 2/2003 | Nahum | |
| 2003/0026458 A1 | 2/2003 | Nahum | |
| 2005/0078095 A1 * | 4/2005 | Ung et al. | 345/175 |
| 2007/0146729 A1 * | 6/2007 | Emtman et al. | 356/614 |

FOREIGN PATENT DOCUMENTS

| | | |
|---|---|---|
| EP | 1 262 738 A1 | 12/2002 |
| EP | 1 473 549 A1 | 11/2004 |
| WO | PCT/US2004/014705 | 5/2004 |

OTHER PUBLICATIONS

U.S. Appl. No. 10/890,919, filed Jul. 13, 2004, Jones et al.

* cited by examiner

*Primary Examiner*—Gregory J. Toatley, Jr.
*Assistant Examiner*—Tri T Ton
(74) *Attorney, Agent, or Firm*—Oliff & Berridge, PLC

(57) ABSTRACT

An operator interface apparatus and associated methods may allow an operator to select and verify various operating parameters for an image correlation type of displacement transducer. A subset of pixels from a detector array or camera may be defined to participate in an image correlation displacement measurement operations.

27 Claims, 14 Drawing Sheets

US 7,400,415 B2

OPERATOR INTERFACE APPARATUS AND METHOD FOR DISPLACEMENT TRANSDUCER WITH SELECTABLE DETECTOR AREA

This application is related to PCT International Application Ser. No. PCT/US2004/014705, filed May 12, 2004, which is incorporated by reference herein in its entirety.

BACKGROUND

This invention is directed to correlation displacement transducers. In particular, this invention is directed to a user interface apparatus for a correlation displacement transducer having a selectable detector area.

Various known measurement transducers may use images acquired by a sensor array, and correlation between such images, to determine deformations and/or displacements. For example, one class of such devices may be based on acquiring a speckle image generated by illuminating an optically rough surface with a light source. The light source may be a coherent light source, such as a laser-generating light source. After the optically rough surface is illuminated by the light source, the light scattered from the optically rough surface may be imaged onto an optical sensor. The optical sensor may be a charge-coupled device (CCD), a semiconductor image sensor array, such as a CMOS image sensor array, or the like.

Prior to displacing or deforming the optically rough surface, a first initial speckle image, sometimes called a reference image, may be captured and stored. Then, after displacing the optically rough surface, a second or subsequent speckle image, sometimes called a current image, may be captured and stored. Conventionally, as much of the first and second speckle images as possible are then correlated or compared on a pixel-by-pixel basis. In general, a plurality of comparisons are performed. In each comparison, the first and second speckle images may be offset, or "synthetically" spatially translated, as by shifting the images electronically, relative to each other. Between each comparison, the amount of offset, or synthetic spatial translation, may be increased by a known amount, such as one image element, or pixel, or an integer number of image elements or pixels.

In each correlation or comparison, the image value of a particular pixel in the reference image may be multiplied by, subtracted from, or otherwise mathematically used in a function with, the image value of the corresponding second image pixel, where the corresponding second image pixel is determined based on the amount of offset. The value resulting from each pixel-by-pixel operation may be accumulated with values resulting from the operation performed on every other pixel of the images to determine a correlation value for that comparison between the first and second images. That correlation value may then be, in effect, plotted against the offset amount, or synthetic spatial translation position, for that comparison, to determine a correlation function value point. The offset amount, or spatial translation position, having the strongest correlation between the reference and first images may generate an extremum, that is, a peak, or a trough, depending on how the pixel-by-pixel comparison is performed, in the plot of correlation function value points. The offset amount, or spatial translation position, corresponding to the peak or trough may represent the amount of relative displacement or deformation between the first and second speckle images.

Similarly, conventional images may be used in image correlation displacement sensing system systems. For such applications, the light source may be an incoherent source, such as a light emitting diode (LED), and the scale or surface to be imaged may be located at an object-side focal plane of imaging optics used to image a pattern of the scale or surface onto an optical sensor of a correlation displacement transducer.

SUMMARY

In either a displacement measuring transducer using a speckle pattern image, or a displacement measuring transducer using a conventional image of a scale or surface, it has been conventional to completely fill the imaging area of the optical sensor, i.e., the detector array, with the image and to output or "acquire" all pixels of the imaging area of the optical sensor for use, or potential use, in the correlation image processing operations. In general, this maximizes the amount of information delivered to the correlation circuits, the achievable signal-to-noise ratio, and the potential sub-pixel interpolation accuracy of the resulting displacement measurement. However, this conventional approach to system design may fail to consider several important system problems that occur in design and operation of a practical product. For example, this conventional approach may lead to disadvantageous requirements on various assembly tolerances and/or allowable tolerances when mounting such displacement measuring sensors in the field. Furthermore, outputting or "acquiring" all pixels of the imaging area of the optical sensor generally decreases the rate at which correlation image acquisition and measurement can be performed, and as a result, generally decreases the displacement speed that is allowable with the associated displacement measuring sensor, thus limiting its utility and/or performance for various applications.

In various exemplary embodiments of the systems and methods disclosed herein, a subset of light-sensitive pixels or elements within a detector array of a surface displacement transducer, called a pixel address window, may be selected using an operator interface apparatus. The pixel address window contains pixels in a "pixel correlation area" which may participate in a correlation calculation for the displacement transducer. A size of the pixel address window may be predetermined as appropriate for a given set of measurement requirements, transducer design constraints, and/or mounting tolerance requirements. By reducing a number of pixels participating in the correlation calculation for the surface displacement transducer, a measurement rate of the transducer may be improved.

According to various exemplary embodiments, during a "calibration" or setup procedure, a surface may be imaged onto an entire detector array of a surface displacement transducer, and output of all elements of the detector array may be measured. A subset of pixels in an area of the detector having a best, or sufficient, output characteristic with respect to providing an accurate correlation measurement, may be determined and selected as a default pixel address window. In exemplary embodiments, the default pixel address window may be centered on a highest intensity pixel value. In other exemplary embodiments, the default pixel address window may comprise a subset of pixels having a best figure of merit, for example, for intensity uniformity.

In various exemplary embodiments, the interface may allow the user to evaluate candidate locations for the pixel address window, by allowing the user to position the pixel address window within any area presented in the image generated by the displacement sensor, and calculating a number of figures of merit for each candidate location. The operator interface apparatus may then allow the user to select an optimum location based on the calculated figures of merit. The figures of merit calculated by the operator interface apparatus may include intensity, uniformity and/or contrast for a given placement of the pixel address window. When the user is satisfied with the figures of merit or the general appearance of the selected pixel address window, the setup procedure may store this pixel address window as a transducer operating parameter corresponding to the locations of the pixels to be used for the surface displacement measurement during normal operation of the displacement transducer.

In various exemplary embodiments, the operator interface apparatus may include functions to display and alter other transducer operating parameters that may affect the quality of the correlation images that are captured and analyzed by the transducer. Such parameters may include, for example, light source control parameters and/or detector control parameters.

These and other features and advantages are described in, or are apparent from, the following detailed description of various exemplary embodiments.

BRIEF DESCRIPTION OF THE DRAWINGS

Various exemplary embodiments are described in detail, with reference to the following figures, wherein.

DETAILED DESCRIPTION

In the systems and methods described herein, an algorithm may be implemented to choose a pixel address window, which is a subset of elements in a detector array, which are used to perform a correlation calculation for a surface displacement transducer. The method may determine a first default location by comparing one or more figures of merit for various candidate locations of the pixel address window, and selecting one location with the best or sufficient figures of merit. The method may then provide an opportunity for an operator to adjust the location of the pixel address window, by displaying the default location within the image acquired, along with the calculated figures of merit. Upon selection of a new candidate location by the operator, the system may calculate the figures of merit for the new candidate location, allowing the operator to compare the figures of merit for the new candidate location with those of the default location. If the figures of merit are acceptable, that is, either optimized or sufficient for acquiring usable images in various applications, the system may define the pixel address window at the selected location for performing the correlation calculation. The algorithm may be performed during a setup or calibration phase of the surface displacement transducer operation, and the selected pixel address window subsequently used during normal operation of the surface displacement transducer.

Similarly, the method may provide an opportunity for an operator to adjust other operating parameters of the surface displacement transducer in order to improve or optimize the images acquired by the transducer during normal operation. Such operating parameters may include, but are not limited to, parameters that may affect the exposure of images, e.g., illumination power, detector array gain, the duration of strobe illumination and/or an electronic shutter timing of the detector array, the alignment and/or gap between the transducer and the surface giving rise to the images, and the like. As the various operating parameters are adjusted, the system may calculate the figures of merit for the images resulting from new candidate parameter setting(s), allowing the operator to compare the figures of merit for the new operating parameters with those of the previous operating parameters. If the figures of merit are acceptable, that is, either optimized or sufficient for acquiring usable images in various applications, the system may define the corresponding operating parameters as the parameters to be used for performing image acquisition. The operating parameter determination may be performed during a setup or calibration phase of the surface displacement transducer operation, and the selected operating parameters used during normal operation of the surface displacement transducer.

Figure 1:
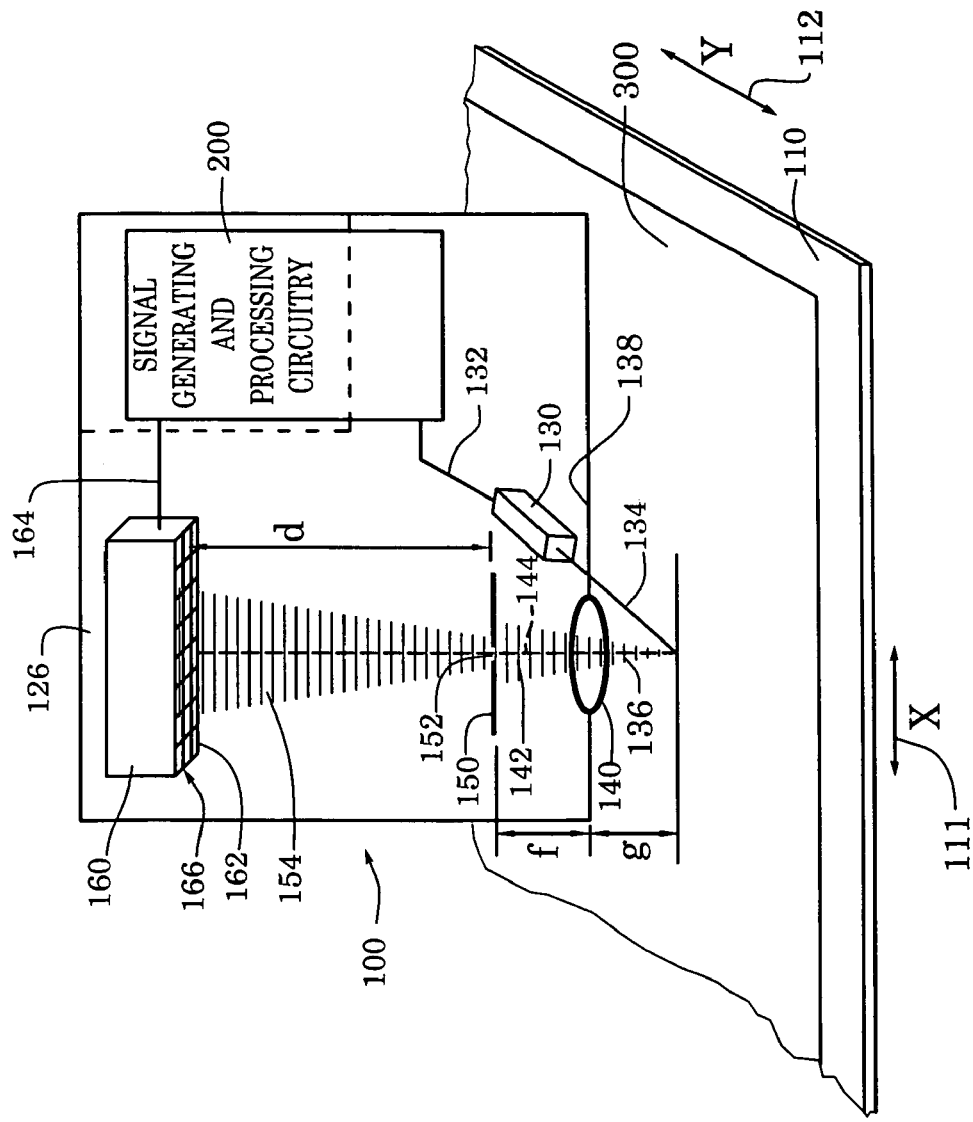
FIG. 1 is a block diagram of an exemplary surface displacement transducer configuration.

FIG. 1 is a block diagram of an exemplary surface displacement transducer 1 usable to generate a position measurement according to the systems and methods disclosed herein. The surface displacement transducer 1 may include a readhead 100, signal generating and processing circuitry 200 and a surface 110. The surface 110 may include a scale pattern 300, which may be imaged by the surface displacement transducer 1 to generate an incremental or absolute position measurement, or the surface may be an optically rough surface from which the surface displacement transducer 1 may generate a displacement measurement from a speckle pattern arising from the optically rough surface, without the need for a scale pattern. The components of the readhead 100, and their relation to the surface 110 and the scale pattern 300, are shown schematically in the exemplary layout of FIG. 1.

In particular, the surface 110 may be positioned adjacent to an illuminating and receiving end 138 of the readhead 100, such that when the surface 110 is illuminated by light emitted from that end of the readhead 100 by a light source 130, the emitted light is selectively reflected back by the surface 110 towards imaging optical elements positioned at that end of the readhead 100. In operation, the surface 110 may be positioned at a generally stable distance from the light source 130 and an optical system housed in the readhead 100. The surface 110 may move relative to the readhead 100 along one or two axes of relative motion, such as along a first measuring axis 111 and a second measuring axis direction 112, as shown in FIG. 1.

The relative motion in a third dimension orthogonal to the first and second measuring axes 111 and 112 is generally constrained, such as, for example, by conventional guide ways or bearings (not shown) mounted to a frame, to maintain the proper relative distance or gap g between the readhead 100 and the surface 110. However, reasonably expected variations in the relative position of the readhead 100 and the surface 110 may also be accommodated as described further below.

In FIG. 1, the image receiving optical elements of the readhead 100 may include a lens 140 positioned at the illuminating and receiving end of the readhead assembly 138 such that an optical axis 144 of the lens 140 is generally aligned perpendicular to the illuminated area of the surface 110. The readhead 100 may further include an aperture 152 included in a pinhole aperture plate 150, spaced apart from the lens 140 along the optical axis 144 by a distance coinciding with the focal length f of the lens 140, and a light detector 160 spaced apart from the aperture 152 included in the aperture plate 150 along the optical axis 144. Such a telecentric arrangement may make the magnification of the image of the surface 110 on the light detector 160 approximately independent of the object distance g from the lens 140 to the surface 110.

The light detector 160 may be any known or later-developed type of light sensitive material or device that can be organized into a 2D array of independent and individual light sensing elements, such as a camera, an electronic or digital camera, a CCD array, an array of CMOS light sensitive elements, or the like.

The light detector 160 may have an array 166 of image elements 162 spaced apart along two directions corresponding, respectively, to each of the two measuring axes 111 and 112, at a known spacing. This known spacing may be the same for the two directions corresponding to the two measuring axes 111 and 112, or may be different for each of the two directions. The known spacing along each of the two directions corresponding, respectively, to the measuring axis 111 and 112 may provide the basis for a high resolution measurement of the displacement or offset along that measuring axis 111 or 112 between a later acquired "current" image projected onto the light detector 160 and a previously acquired "reference" image that includes an image portion that generally matches an image portion of the later acquired image. The known spacing in the direction along each measuring axis 111 and 112 may provide the basis for measuring along each measuring axis 111 and 112 the displacement of the images of the surface 110 or the scale pattern 300 to resolution as fine or finer than the known spacing along that measuring axis 111 or 112 in the optical transducer 100.

In addition, the surface displacement transducer 1 may include at least a portion of the signal generating and processing circuitry 200. As shown in FIG. 1, a signal line 132 from the signal generating and processing circuitry 200 is connected to the light source 130, to control and/or drive the light source 130. A signal line 164 connects the light detector 160 and the signal generating and processing circuitry 200. In particular, each of the image elements 162 of the array 166 can be individually and controllably addressed to output a value representing the light intensity on that image element 162 over the signal line 164 to the signal generating and processing circuitry 200.

Additional portions of the signal generating and processing circuitry 200 may be placed remotely from the readhead 100, and the functions of the readhead 100 can be operated and displayed remotely by the operator interface apparatus 400, as described further below with respect to FIGS. 3 and 14. The signal generating and processing circuitry 200 is described in greater detail below with respect to FIG. 13.

As shown in FIG. 1, a light beam 134 is emitted by the light source 130 and is directed onto the surface 110 to illuminate a portion of the surface 110. As a result, the illuminated portion of the surface 110 reflects light 136 about the optical axis 144. The angle with which the light beam 134 strikes the surface 110, may be about 45° relative to the plane of the surface 110.

The surface displacement transducer 1 may be a relative displacement transducer, using a light source 130 which is coherent, and measuring the displacement using a speckle pattern. The optical displacement transducer may alternatively be an absolute correlation position transducer using a conventionally imaged scale pattern 300, and the light source 130 may be an incoherent light source, such as a light emitting diode (LED) diode, and the surface 110 is nominally located in the focal plane of the lens 140, at a distance g from the lens 140.

The mounting of the light source 130, the lens 140, the aperture plate 150, and the light detector 160 in the housing of the readhead 100 may be done according to conventional methods of miniature optical system construction and/or industrial camera construction, provided that the components are mounted in a relatively precise and stable manner. When the readhead 100 is suitably positioned adjacent to the surface 110, each image captured by the light detector 160 will contain portions having characteristics that are determined by a corresponding portion of the surface 110.

Additional design considerations and/or alternative designs, usable for the surface displacement transducer 1, are disclosed in the previously incorporated PCT International Application Ser. No. PCT/US2004/014705, in U.S. Pat. No. 6,642,506 to Nahum, and in co-pending U.S. patent application Ser. No. 10/890,919 (the '919 Application), filed Jul. 13, 2004, all of which are incorporated herein by reference in their entirety.

In situations in which the operative gap g between the lens 140 and the surface 110 is not well established and/or controlled, variations in the gap dimension g will cause the illumination spot on the surface 110 to move relative to the optical axis 144, because of the non-normal angle of incidence of the beam 134 relative to the surface 110. For example, assuming that the allowed variation in the gap g between the lens 140 and the measurement surface 110 during mounting installation is about +/−100 μm, because of the approximately 45° non-normal angle of incidence of the illumination beam 134 on the target surface 110, the location of the illumination spot reflected by the surface 110 may move sideways by about +/−100 μm. Assuming the optical displacement sensor provides a 5× magnification of the image arising from the target surface one the detector array 166, the illumination central ray path will move about +/−500 μm across the surface of the detector array 166. Thus, to accommodate or encompass this variation, with about a 6 μm pixel pitch between the light sensitive detector elements 162, the center of the overall intensity pattern may move by up to approximately 500/6=83 pixels along the direction of the detector array 166 that corresponds to the direction of the apparent displacement of the central illumination ray of the illumination beam 134 on the surface 110 (due to the variation in the gap g in combination with the angle of incidence of the illumination beam 134.)

Therefore, if the optical displacement sensor is designed such that the expected pixel address window nominally encompasses the desired high intensity and relatively uniform central portion of the overall image intensity pattern on the detector array 166 and is, for example, 256×256 pixels in area, the minimum detector size along the direction that corresponds to the direction of the apparent displacement of the central illumination ray is 256+2*83=422 pixels, and along that direction of the detector array 166, the number of pixels of the detector array 166 may be at least 60% larger than the number of pixels in the expected pixel address window along that direction. The allowable mounting variation may also be more restricted and/or less conservative, and the number of pixels of the detector array 166 along that direction is only at least 50% larger, or only at least 40% larger, than the number of pixels in the expected pixel address window along that direction. In other words, the pixel address windows would contain, at most, about 70% of the pixels in the detector array.

In some cases, the availability and economy of detector arrays having approximately 640×480 pixels is a dominant design factor. Thus, when a pixel address window of 256×256 pixels is used with such detector arrays, the area of the detector array may be greater than four times the area of the pixel address window. Therefore, the chosen detector area depends not only on the requirements of the displacement measurement, such as range and resolution, as described in further detail below, but also on a tolerance stackup of the optical path components and reasonably expected gap variations during installation and operation and the field.

Because not all of the pixels of the detector array 166 may provide useful image information in terms of the correlation calculation to follow, their image data may not be output or "acquired." Because not all of the pixels in the detector may be output or used to perform the correlation measurement, the rate of correlation measurements may be significantly improved. The selection of the location of the 256×256 pixel address window of pixels which may participate in the correlation measurement, within the larger, for example, 640×480 detector area, may be made by the systems and methods described below.

As discussed above with reference to FIG. 1, any misalignment of lens 140 or other optical elements (not shown) in readhead 100, or variations in the gap distance g, will alter the location of the maximum image intensity spot on detector array 160. If there are no such misalignments, the center of the overall image intensity pattern will be located in the center of pixel array 166, which may have approximately 640×480 pixels, but may alternatively have more or fewer pixels. In this case, the center of the pixel address window may coincide with the center of the detector array.

Figure 2:
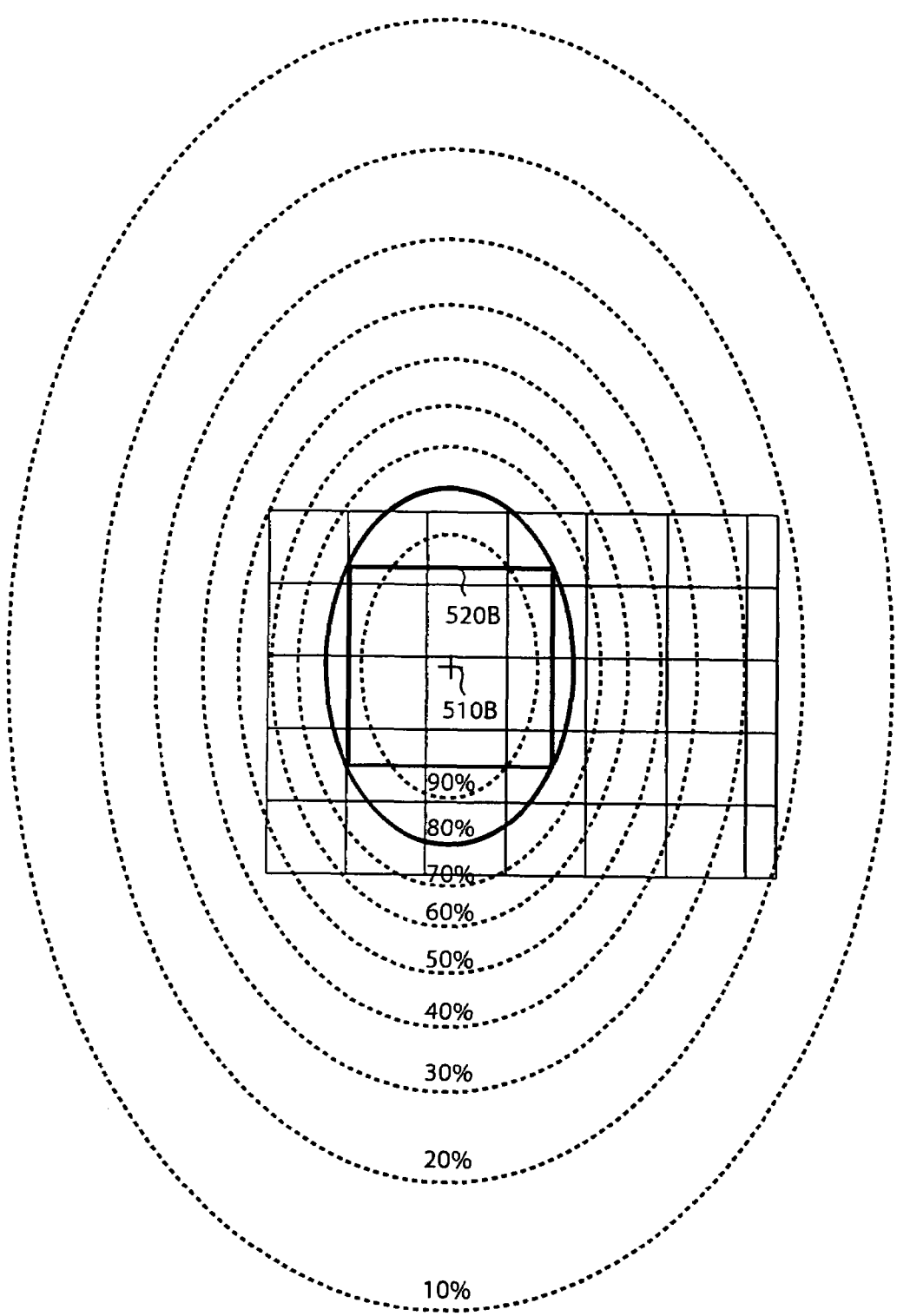
FIG. 2 is an illustration of an exemplary distribution of image illumination intensity on a detector array, with respect to the placement of a pixel address window.

However, when such misalignments do exist, the beam spot may be shifted on the detector array 160. The situation is illustrated by FIG. 2. The elliptical beam shape shown in FIG. 2 may result from the approximately 45 degree angle of incidence with which the illumination beam 134 strikes the target surface 110. In the illustrated case, the beam spot center 510B may be shifted left and up compared to the center of the detector array. The pixel address window is defined as the 256×256 set of pixels that is, ideally, centered on the beam spot center 510B and that generally contains those pixels with a nominal image intensity distribution value level within 80% of the nominal maximum image intensity distribution value. Thus, the pixel address window 520B in FIG. 2 may be shifted to the left and upward with respect to the center of the detector array 160, in order to coincide with the beam spot center 510B. The illumination system and/or the pixel address window may be designed such that the pixel address window includes only pixels within a region of the overall image intensity distribution that coincides with a certain minimum percentage of the nominal maximum intensity of the overall image intensity distribution, for example, within 80%, of the maximum of the image intensity distribution as shown in FIG. 2. This tends to insure that the pixel address window coincides with a relatively uniform and high intensity central portion of a desirable image intensity distribution, which tends to provide the best measurement resolution and accuracy, as previously described. In one exemplary embodiment of the systems described herein, the pixel address window may be automatically determined such that it is centered on the beam spot center 510B, as illustrated in FIG. 2, and displayed on an interface apparatus as the first default location for the pixel address window.

However, it should be appreciated that a relatively more uniform correlation image intensity may tend to increase the accuracy of the correlation operations used for displacement measurements, as may a relatively higher image contrast available in certain parts of the correlation image. Accordingly, accuracy trade-offs may exist between the combination average intensity, the nominal intensity uniformity, and the nominal contrast, and the like, which may exist in various regions of an image. Therefore, in some exemplary embodiments, a number of figures of merit for the selection of the location of a pixel address window may be computed. These figures of merit may include, but are not limited to, the level of average intensity, level of uniformity, and level of contrast, as outlined in greater detail below. Accordingly, in some embodiments, the default location for the pixel address window may be determined and displayed based on a desired combination of such figures of merit.

Figure 3:
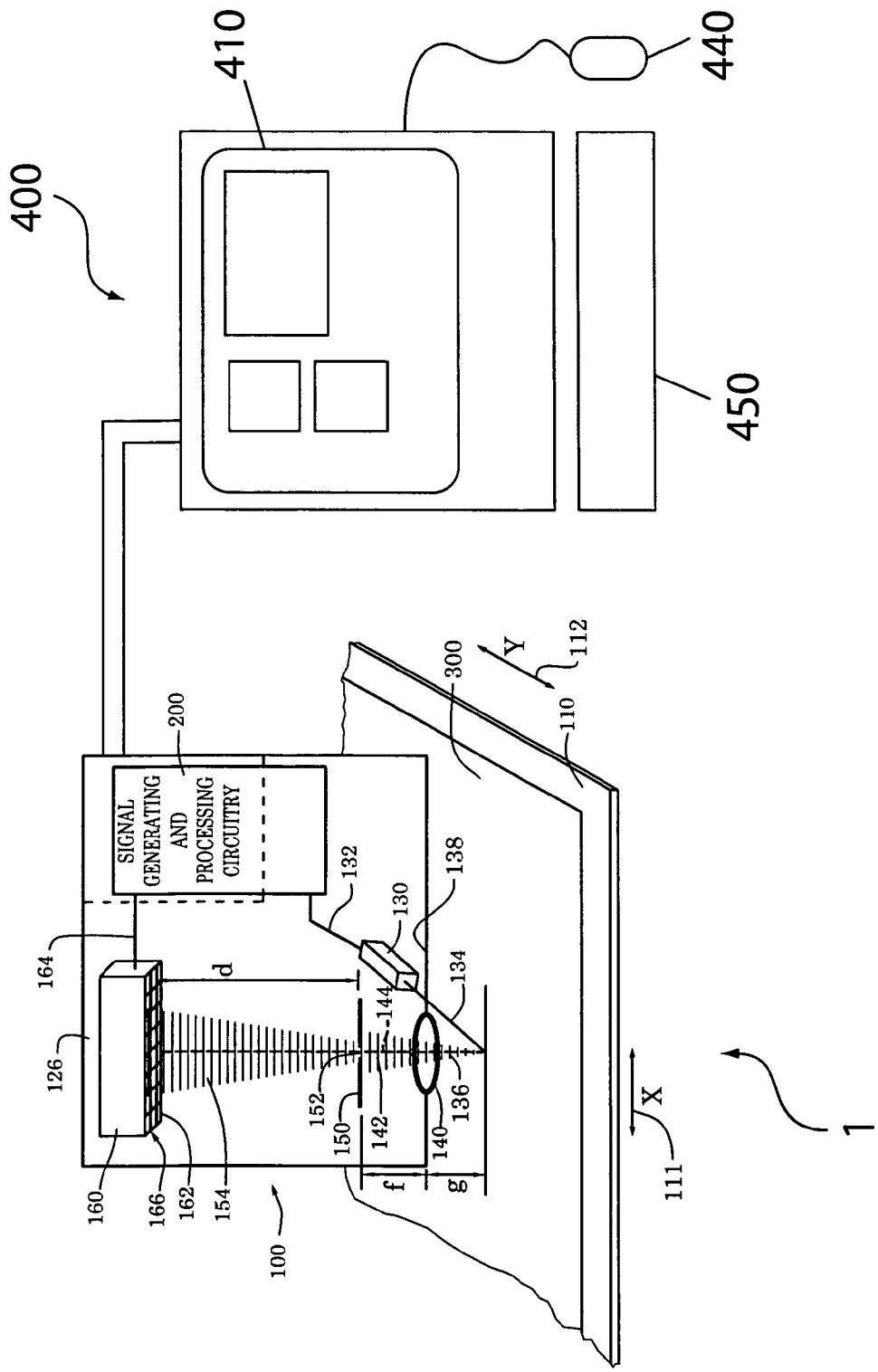
FIG. 3 is a schematic diagram of an exemplary embodiment of an operator interface apparatus in communication with the surface displacement transducer of FIG. 1.

In any case, an acquired image may be output or displayed, along with a rendering of a pixel address window location within the image, and the figures of merit associated with the location, by an operator interface apparatus 400 such as that depicted in FIG. 3. FIG. 3 depicts an operator interface apparatus 400 configured to perform the algorithm described further below, for selecting and displaying the location for an operator, and then allowing the operator to choose another candidate location for the pixel address window. The system then computes the figures of merit for the newly selected candidate location of the pixel address window, so that the operator can compare these values with those associated with the default location. The apparatus 400 may include a display 410, and input devices such as a mouse 440, and keyboard 450. The display may be used to display the acquired image, along with a display of the default location of the pixel address window, selected by the method described in further detail below, for example. The input devices may then be used by the operator to control the operator interface apparatus 400, for example, to select other candidate locations for the pixel address window, as well as to specify other operating parameters of the surface displacement measurement device 1. The operator interface apparatus 400 may then compute figures of merit for the candidate locations, and display the computed figures of merit on display 410.

Figure 4:
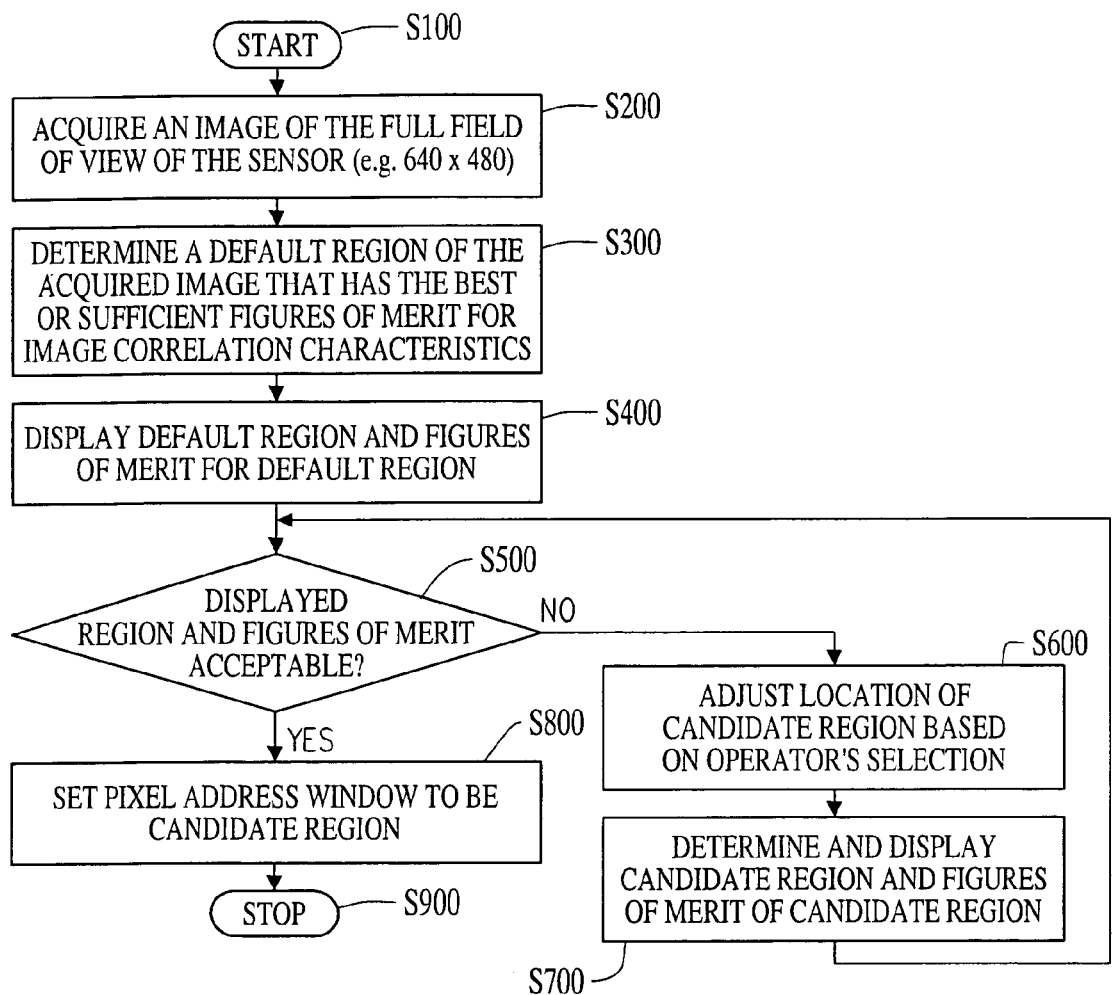
FIG. 4 is a flowchart illustrating an exemplary method of using an operator interface apparatus, for example, in order to select a location for a pixel address window.

An algorithm is illustrated in FIG. 4, which may be used in conjunction with the operator interface apparatus 400, for example, to automatically select a default location of the pixel address window, display the default location and the figures of merit associated with the default location, and then allow an operator to further adjust the location of the pixel address window. The operations shown in FIG. 4 may be executed automatically, semi-automatically, or manually, as part of a calibration or set up procedure, for example, that ensures proper operation and/or enhanced measurement accuracy and/or resolution from the surface displacement transducer. Assuming an operably arranged displacement transducer and target surface, a set of initial operating parameters that are sufficient to acquire a usable image (for example, the type of operating parameters described below with reference to FIG. 11), and a detector array that hypothetically includes an array of 640×480 pixels for the purposes of this explanation, the method may begin in step S100 and proceed to step S200, wherein an image, that is, the image values, of the full field of view of the detector array may be output or acquired. In step S300, the image may be analyzed and a default region in the image with the best or sufficient correlation image characteristics may be determined. In step S400, a default region, that is, the location of a default pixel address window, and the figures of merit for the default region, may be displayed to the operator. In step S500, a determination may be made whether the displayed default region and figures of merit are acceptable, for example, the operator may evaluate the portion of the image in the default region and/or the figures of merit and decide the acceptability of the results. If the results are not acceptable, the process proceeds to step S600, where the location of the candidate pixel address window may be selected by an operator viewing the display screen. For example, the operator may "drag and drop" a rectangular border indicating the candidate pixel address window at a new location, or specify the pixel address for the nominal location and/or extents of a new candidate pixel address window, or the like. In step S700, the figures of merit of the newly selected candidate location of the pixel address window may be determined and displayed. For example, the figures of merit may be updated automatically once the new candidate location is selected, or the operator may trigger a new determination or re-calculation of the figures of merit, for example, by selecting an option included in the operator interface apparatus 400. By adjusting the location of the pixel address window, and then calculating the values of the figures of merit, an operator may be able to relocate the center of the pixel address window in order to improve the surface displacement measurement accuracy. The process then returns to step S500, wherein the determination may be made whether the candidate location and its associated figures of merit are acceptable. If so, the pixel address window may be set to be the present candidate location in step S800. The process may then end in step S900.

Figure 5:
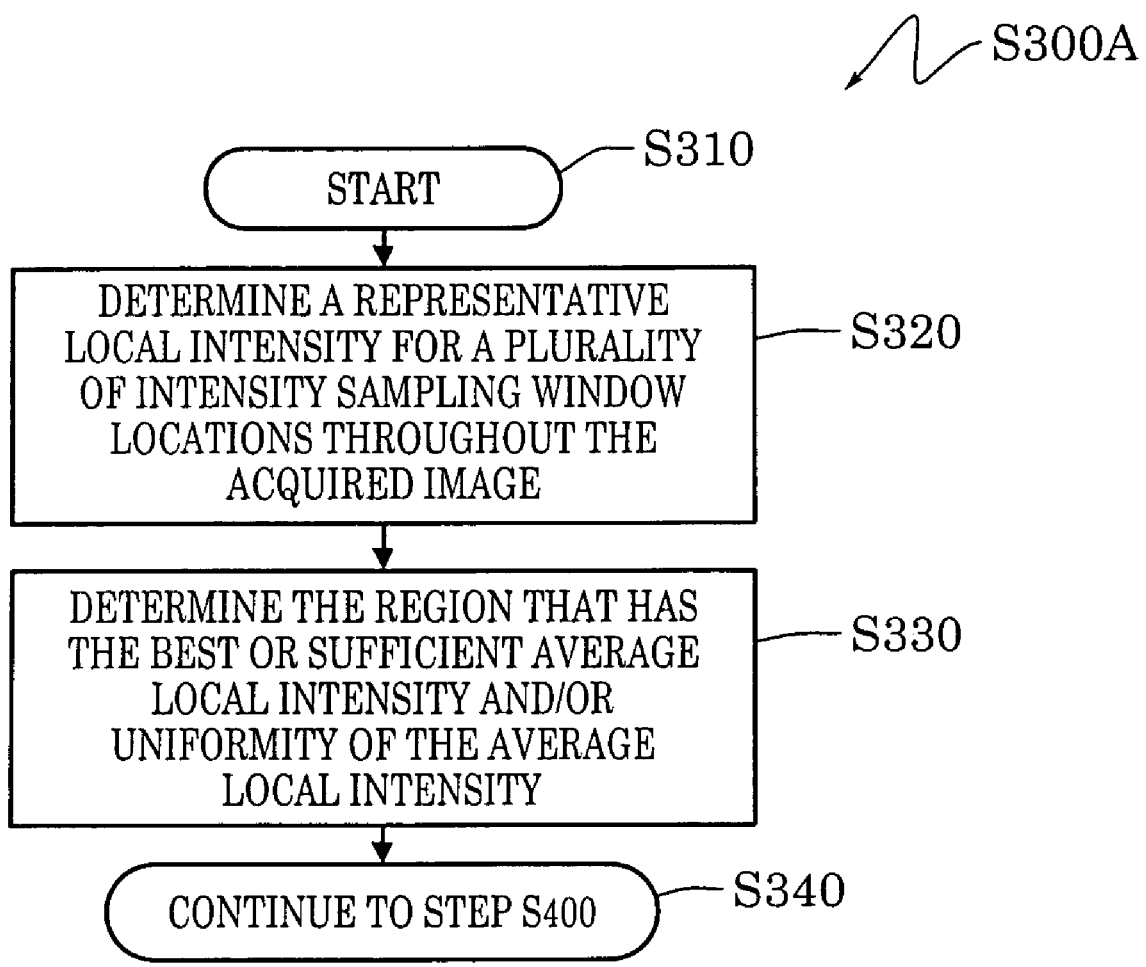
FIG. 5 is a flowchart illustrating additional exemplary details of the method of FIG. 4.

In various respective embodiments, step S300 of FIG. 4 may comprise determining various respective figures of merit for local sets of one or more pixels, and selecting as the pixel address window, the window centered at the local set having the best figure(s) of merit. In one exemplary embodiment, when relatively homogeneous images without saturated pixels may be expected, step S300 of FIG. 4 may comprise simply determining which pixel in the array has the maximum intensity, and selecting as the pixel address window, the window for which the maximum intensity pixel is at the center. However, in other exemplary embodiments, to achieve a more robust and reliable result, one or more figures of merit based on a plurality of pixels may be included for determining the selection of the pixel address window. For example; FIG. 5 shows one exemplary set of operations S300A usable for the step S300 of FIG. 4. The operations shown in FIG. 5 may begin at step S310, and proceed to step S320. In step S320, a representative local intensity, such as an average intensity, may be obtained for each one of a set of windows located at different locations within the detector array. The set of windows may approximately, or completely, cover the entire detector array. The process may then proceed to step S330, wherein the region that includes the window or windows having the best or sufficient representative, or average, intensity and/or uniformity of intensity may be determined. The process may then return to step S400, wherein the corresponding pixel address window may be displayed, along with the figures of merit for the location, based on the region having the best or sufficient average intensity and/or uniformity of intensity.

Figure 6:
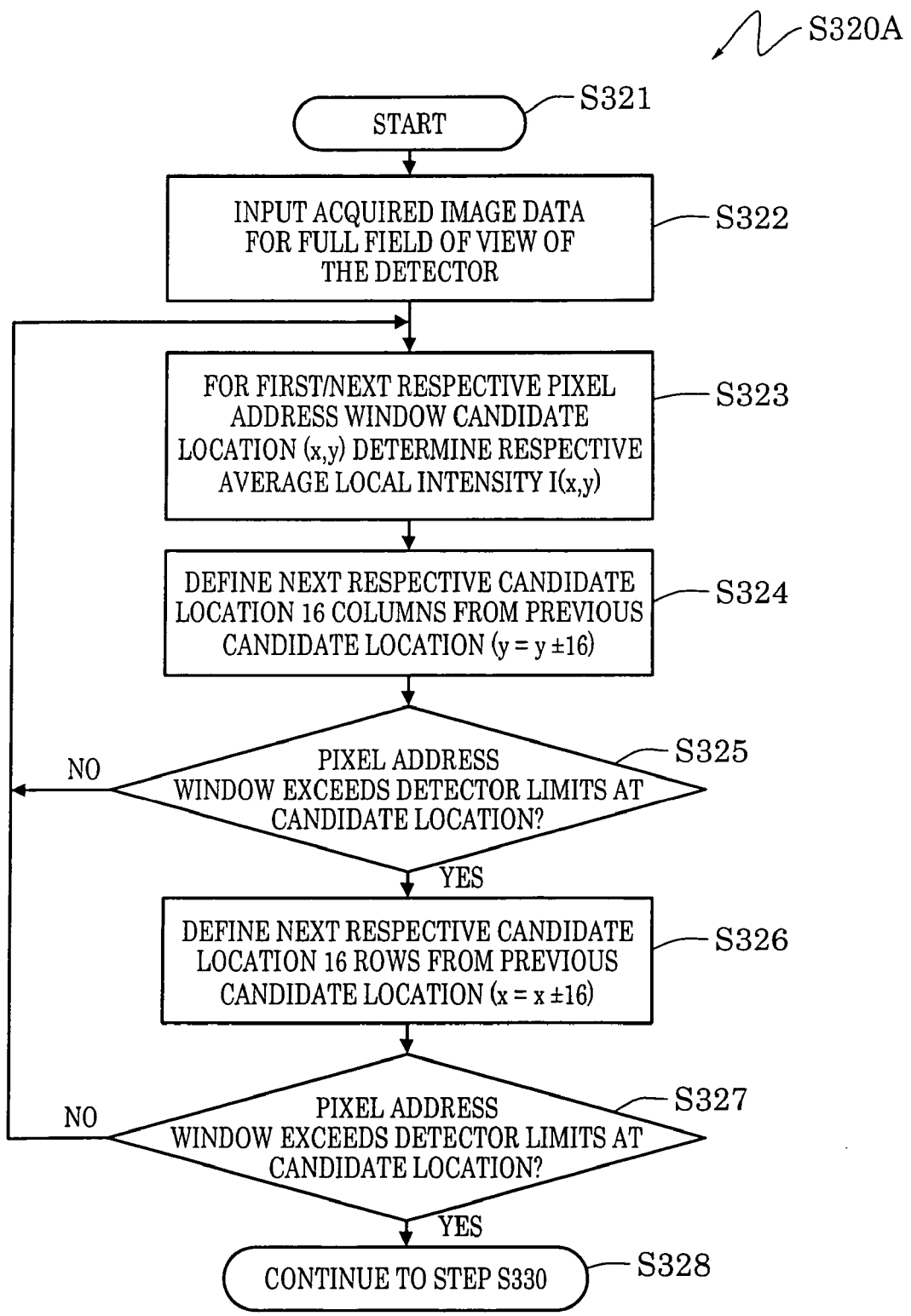
FIG. 6 is a flowchart illustrating additional exemplary details of the method of FIG. 4.

FIG. 6 shows one exemplary set of operations S320A usable for the step S320 of FIG. 5. The set of operations may begin at step S321, and continue at step S322 by inputting the data of an acquired image that approximately, or completely, covers the full field of view of the detector array. This may be the image acquired in the step S200 of FIG. 4, for example. Next, in step S323, a first or next intensity sampling window of pixels may be selected in the image, and the average intensity within this window is calculated and stored. The intensity sampling window may be chosen to be the same size as the pixel address window, which is 256×256 pixels in this example. Thus, each respective intensity sampling window may also be regarded as a respective pixel address window candidate at a respective candidate location on the detector array. The candidate location may be represented by a respective set of (x, y) pixel address coordinates.

Next, operations continue to step S324 where the next respective pixel address window candidate location may be defined. In the operations shown in FIG. 6, the location of the first respective pixel address candidate may be in the corner of the detector array which has the lowest-valued pixel address coordinates. Then in step S324 the next respective pixel address window candidate location may be defined by incrementing (or decrementing) the pixel address "column values" by 16 pixels. Of course, this increments (or decrements) the y value of the respective set of (x, y) pixel address coordinates that represent the current candidate location by 16. In general, the y values may initially be incremented until the y address exceeds the maximum y address in the detector array, and then the y values are decremented until the y address is less than the minimum y address in the detector array, and so on. Next, in step S325, it is determined whether any portion of the currently defined pixel address window falls outside of the extents of the image. If the entire currently defined pixel address window falls within the image, operations may continue with the step S323, which determines the respective average local intensity for the currently defined pixel address window candidate location. Otherwise, if any portion of the currently defined pixel address window falls outside of the extents of the image, the currently defined pixel address window location may be abandoned, and operation continues to the step S326.

At the step S326 the next respective pixel address window candidate location may be defined by incrementing the pixel address "row values" by 16 pixels. Then, in step S327, it is again determined whether any portion of the currently defined pixel address window falls outside of the extents of the image. If the entire currently defined pixel address window falls within the image, operations continue with step S323, which determines the respective average local intensity for the "next", that is, the currently defined, pixel address window candidate location. Otherwise, if any portion of the currently defined pixel address window falls outside of the extents of the image, the entire image has been analyzed, and the currently defined pixel address window location is abandoned. The process then returns to step S330, wherein the previously determined average intensity values for each respective pixel address window candidate may be analyzed to determine the region that has the best or sufficient average local intensity and/or uniformity of the average local intensity.

Of course, the intensity sampling window and/or the pixel address window may have sizes other than the 256×256 pixels. However, in various embodiments it may be most convenient if the size of the intensity sampling window corresponds to the size of the desired pixel address window.

Figure 7:
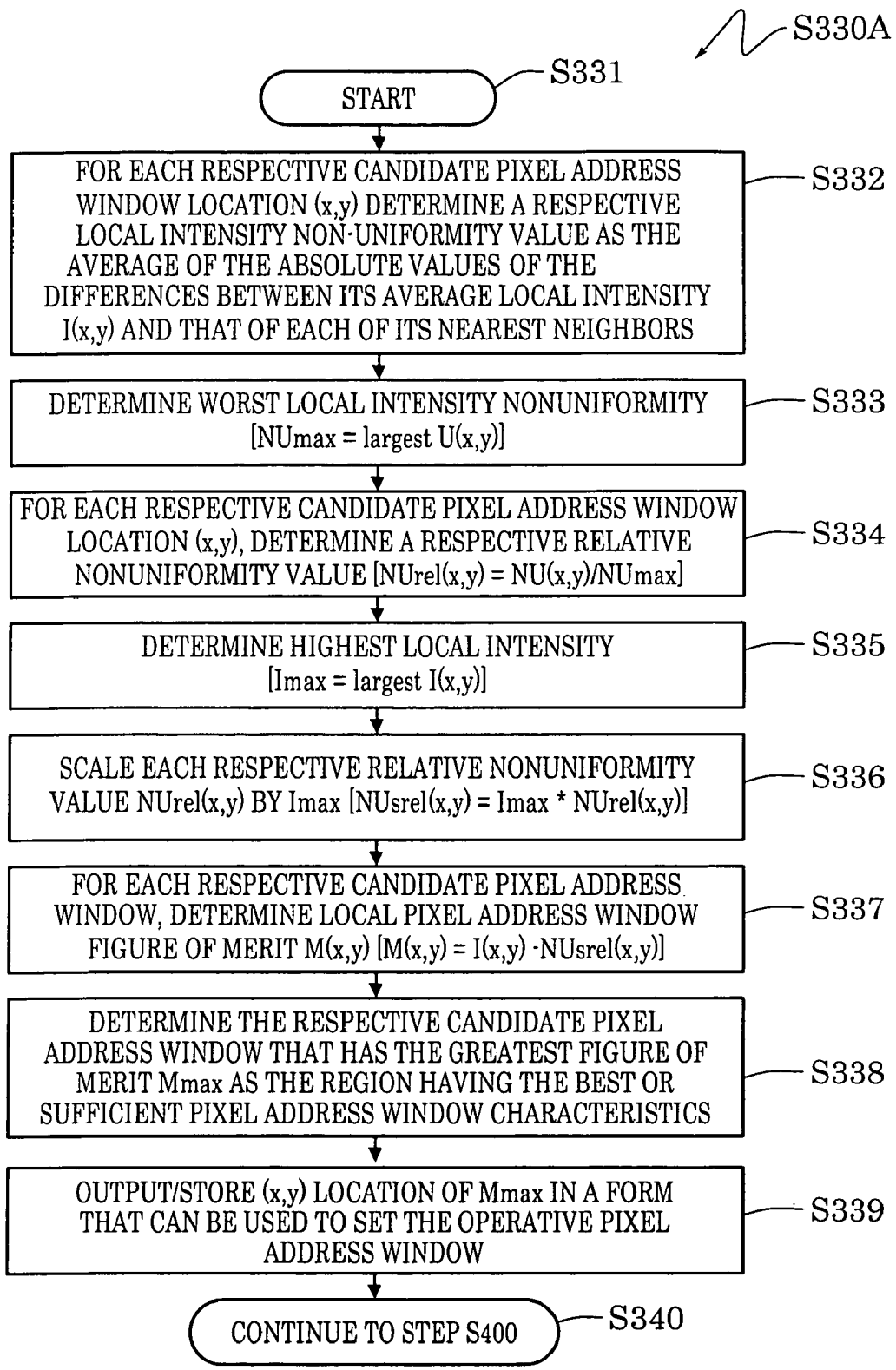
FIG. 7 is a flowchart illustrating additional exemplary details of the method of FIG. 4.

FIG. 7 shows one exemplary set of operations S330A usable for the step S330 of FIG. 5. In general, this set of operations employs a figure of merit that combines both image intensity and image intensity uniformity information, in order to indicate whether a particular candidate pixel address window has a best or sufficient combination of correlation image characteristics. This set of operations may be particularly well suited for use in conjunction with the operations S320A of FIG. 6. The set of operations S330A starts in step S331 and proceeds to step S332, wherein a local intensity non-uniformity value may be determined for each respective candidate pixel address window location, for example, based on the set of average local intensity values provided by the set of operations shown in FIG. 6. As previously described, according to the set of operations shown in FIG. 6, the average local intensity values may be available for each of the respective candidate pixel address window locations that are spaced apart by 16 pixels along both the row and column directions of the detector array. This set of respective candidate pixel address window locations may be referred to as candidate locations on a location grid. As a first step in determining the figure of merit referred to above, for each respective candidate location on the location grid, the operations of step S332 may determine a set of absolute values of the differences between the average intensity value corresponding to that candidate location and the average intensity values corresponding to each of its x and y direction nearest neighbors on the location grid. The average of this set of absolute values may then be determined. Each such average may be referred to as a non-uniformity value. It should be apparent that a low non-uniformity value may correspond to a relatively high degree of intensity uniformity at that respective candidate location, such as the relatively high degree of intensity uniformity that occurs near the central portion of a Gaussian image intensity distribution, as previously described. Conversely, a high non-uniformity value may correspond to a relatively low degree of intensity uniformity at a respective candidate location, such as the relatively low degree of intensity uniformity that occurs around the half-width-half-max of a Gaussian image intensity distribution.

In step S333, the highest average value (corresponding to the worst non-uniformity) out of all of the average values determined for all of the candidate locations on the location grid, may be determined, for use in the following step. In step S334, a relative, or "normalized", non-uniformity value may be determined for all of the candidate locations on the location grid, by dividing each previously determined non-uniformity value by the highest non-uniformity value (which was determined in the step S333.) In step S335, the highest average local intensity may be determined out of all of the average intensity values determined for all of the candidate locations on the location grid. It should be appreciated that a relatively higher average intensity value may be generally preferred for correlation image calculations, for reasons previously described.

In step S336, the relative, or "normalized", non-uniformity values determined in step S334 may be scaled by the highest average local intensity determined in step S335. The scaling may simply be the multiplication of the relative non-uniformity values determined in step S334 by the highest average local intensity determined in step S335. It should be appreciated that for relatively high non-uniformity values that approach a value of one, the scaling may produce a value that approaches is the highest average local intensity determined in step S335. Conversely, for relatively low non-uniformity values (that is, values reflecting regions of high uniformity) that approach a value of zero, the scaling may produce a value that approaches zero. In essence, the purpose of this step is to provide a value that may roughly be comparable to the respective average local intensity values at the various locations on the location grid, but that may also strongly be influenced by the respective non-uniformity associated with those various locations on the location grid.

Next, in step S337, for each respective location on the location grid, that is, for each respective candidate pixel address window location, the figure of merit may be determined. The figure of merit may be determined for each respective location by subtracting the scaled relative non-uniformity value determined for that location in step S336 from the respective average local intensity previously determined for that location. In general, higher values of the figure of merit may reflect a respective high local intensity and a relative non-uniformity value of approximately zero (which occurs in regions of high uniformity). Increasingly poorer values for the figure of merit may become increasingly smaller, as the respective local intensity value decreases and as the relative non-uniformity value of approaches one (which occurs in regions of poor uniformity). Accordingly, it should be apparent that, in the case of a Gaussian illumination beam, the best possible values for the figure of merit, that is, the "most positive" of the values for the figure of merit, may tend to occur at respective locations on the location grid that approximately coincide with the relatively uniform and high image intensity regions corresponding to the central portion of the Gaussian image intensity distribution, as previously described with reference to FIG. 2. However, this figure of merit may also work well for various other illumination beam intensity profiles and the resulting image intensity distributions.

In step S338, in one example the respective location on the location grid that corresponds to the respective pixel address window that may have the best value for the figure of merit, that is, the "most positive" of the values for the figure of merit, may be determined. In another example, the first respective location on the location grid that corresponds to the respective pixel address window that is determined to have sufficiently good correlation image characteristics, as indicated by a "sufficiently positive" value for the figure of merit, may be determined. A value for the figure of merit which corresponds to "sufficiently good" correlation image characteristics may vary and/or depend on the measurement resolution requirements in various applications, and may be determined based on experience and/or specific experiments, in any case.

In step S339, the default location of the location grid having the best or sufficient pixel address window characteristics, as determined according to the location corresponding to the best or sufficient figure of merit determined in step S338, may be stored and/or output, such that it is usable to define the default location of the operative pixel address window. In step S340, the process returns to step S400 of FIG. 4, wherein the default pixel address window and the figures of merit are displayed for the operator.

Therefore, the default location may be chosen automatically by operator interface system 400, using the algorithms illustrated in FIGS. 4-7. The default location of the pixel address window on the detector may be selected automatically, after establishing the actual operating gap by mounting the device in the field, and/or at the end of the manufacturing assembly process by establishing a nominal operating gap and performing the initial setup algorithm. The default pixel address window and the associated figures of merit may then be displayed for the operator using the system shown in FIG. 3.

Figure 8:
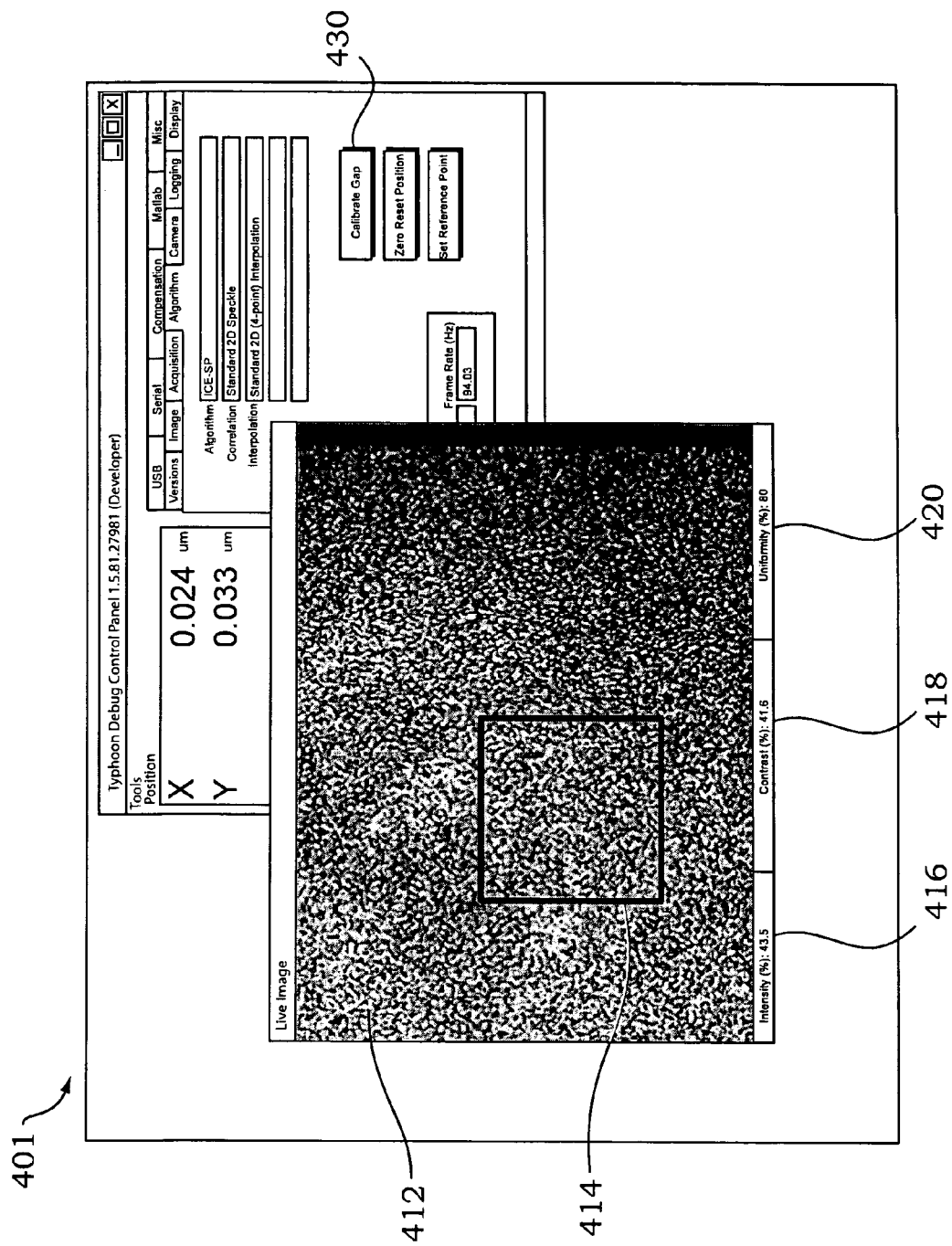
FIG. 8 is a screen shot of an exemplary screen from the operator interface apparatus of FIG. 3.

For example, the operator interface apparatus 400 may generate a display which includes the acquired image, as well as the default location, as well as the figures of merit associated with the default location. An exemplary screen shot 401 displaying these items is shown in FIG. 8. The screen shot 401 shows various elements of the operator interface apparatus 400 that may be displayed on the display screen 410 shown in FIG. 3, including an acquired image 412, within which the default or candidate pixel address window indicator 414 may be displayed. Also displayed may be the average intensity 416 corresponding to the indicated pixel address window, which may be expressed as a percent by dividing the average intensity for the pixel address window by the maximum grayscale value of 255 or by a normalization factor such as the maximum pixel intensity for the acquired image, and/or according to the calculations described with reference to FIGS. 6 and 7. The elements of the operator interface apparatus 400 on the display screen 410 may also include an intensity uniformity figure of merit 420, computed according to the algorithm described with reference to FIG. 7, for example, and a contrast figure of merit 418 based on intensity differences in the selected pixel address window of the detector array 160. In one embodiment, the contrast figure of merit may be defined according to the following function:

$$\text{Contrast} = \sum_{i=1}^{n-1} (A_i - B_i)^2 + (A_i - C_i)^2 + (D_i - B_i)^2 + (D_i - C_i)^2 \quad (1)$$

where n corresponds to the number of pixels in the pixel address window, and $A_i$, $B_i$, $C_i$ and $D_i$ are the intensities of the "ith" group of four nearest neighbor pixels which may be represented by a position "i."

Figure 9:
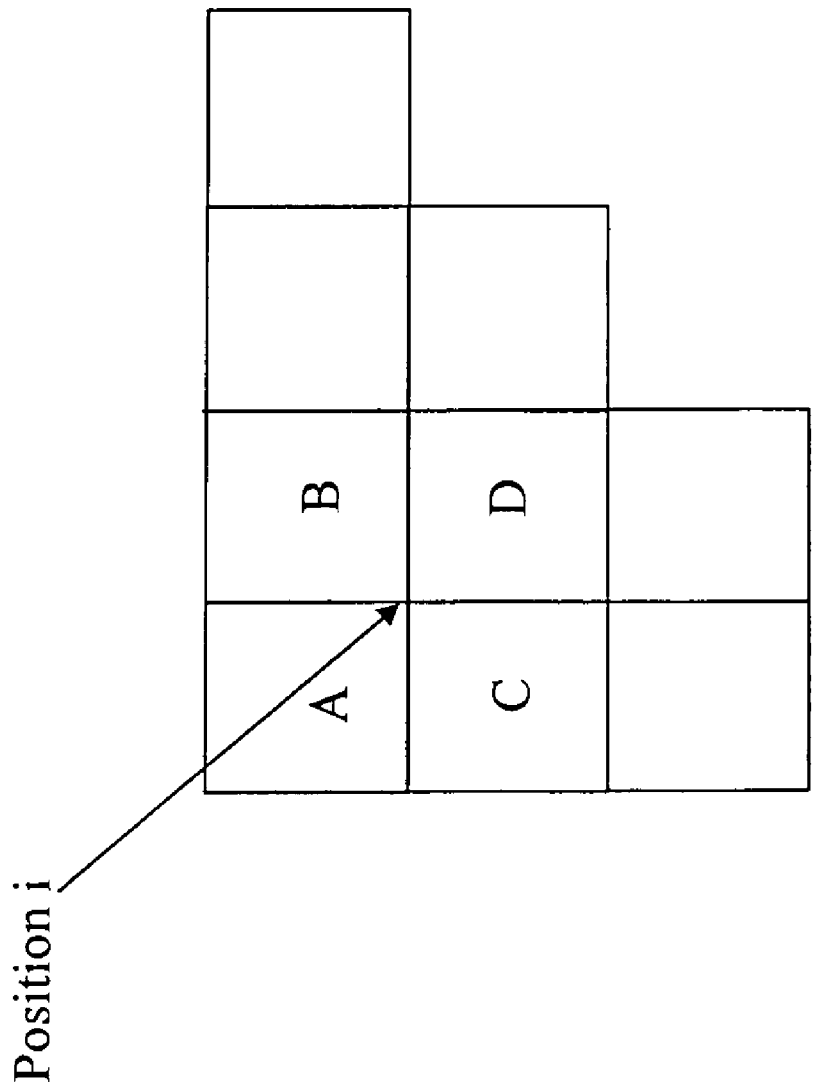
FIG. 9 illustrates locations of pixels participating in an exemplary embodiment of a contrast calculation of the operator interface apparatus of FIG. 3.

FIG. 9 is a diagram illustrating the locations of positions A, B, C and D in the pixel array that correspond to the $A_i$, $B_i$, $C_i$ and $D_i$ intensities for the above equation for one position "i" located in the middle of ABCD, as shown in FIG. 9. The contrast may be computed and displayed as a percentage by dividing the sum indicated in Eq. (1) by a normalization factor. In one embodiment, a suitable normalization factor is $[(n-1)*(255/2)^2]$, but more generally the normalization factor may be chosen to provide a reasonable range of contrast percentage values for the types of images expected for a particular type of transducer or application. In another embodiment, the contrast figure of merit may be the standard deviation of grayscale intensity values of the pixels included in the pixel address window.

More generally, it should be understood that the figures of merit shown displayed in FIG. 8 are exemplary only, and many other figures of merit may be computed and displayed in addition to, or instead of, those shown in FIG. 8. FIG. 8 may also include other set-up or calibration functions, such as indicated by the "Calibrate gap" control option 430 in FIG. 8. Choosing or activating the "Calibrate gap" control option 430 may cause the surface displacement transducer 1 to activate a white light source, and display the real (live) image 412 on the interface display 410, along with at least the contrast figure of merit 418 (which may be updated for each updated live image), which is sensitive to the amount of blur in an image. The gap g between the readhead 100 and the measurement surface 110 may then be adjusted until the contrast figure of merit is maximized. Performing this calibration may set the surface 110 at the focal plane of the readhead lens 140, thereby reducing the measurement sensitivity to alignment variations, as described in the previously incorporated '919 Application.

Another adjustment procedure may also be useful in some applications. The procedure may possibly follow setting the gap g as just described, or may be used independently. In particular, a rotational degree of freedom of the mounting of the readhead 100 and/or an alignment of an adjustable illumination source within the readhead may be adjusted while maintaining a nominal distance for the gap g and maintaining a selected or desired pixel address window, to improve the illumination distribution within the selected or desired pixel address window. By altering the rotational alignment of a readhead having an angled illumination source and/or by altering the alignment of an adjustable illumination source, the illumination distribution within the selected or desired pixel address window may be adjusted until the intensity and/or uniformity figures of merit (which may be updated for each updated live image) are sufficient or maximized.

After displaying an acquired image 412, a default or candidate pixel address window 414, and the associated intensity figure of merit 416, contrast figure of merit 418, and/or uniformity figure of merit 420, the operator interface 400 may allow the operator to choose another candidate location for the pixel address window. Using input devices, the operator may then input a new choice of location or candidate region for the candidate pixel address window. The candidate region may be selected by the operator using a pointing device, such as the mouse 430, to indicate a location on the screen 410 for the location of the candidate region. The mouse 430 may indicate the location of the upper left corner of the candidate region, or the center point of the candidate region, for example. The operator may choose the new location based on his qualitative interpretation of the live image, as well as his experience in what types of image attributes yield the best displacement measurement. The operator interface apparatus 400 may then compute the same figure(s) of merit for the new candidate location, as previously computed for the default location. The operator interface apparatus 400 may then output a second or updated set of elements to the display 410 for operator evaluation or confirmation. This process may be reiterated until the image quality and/or pixel address location are satisfactory.

Figure 10:
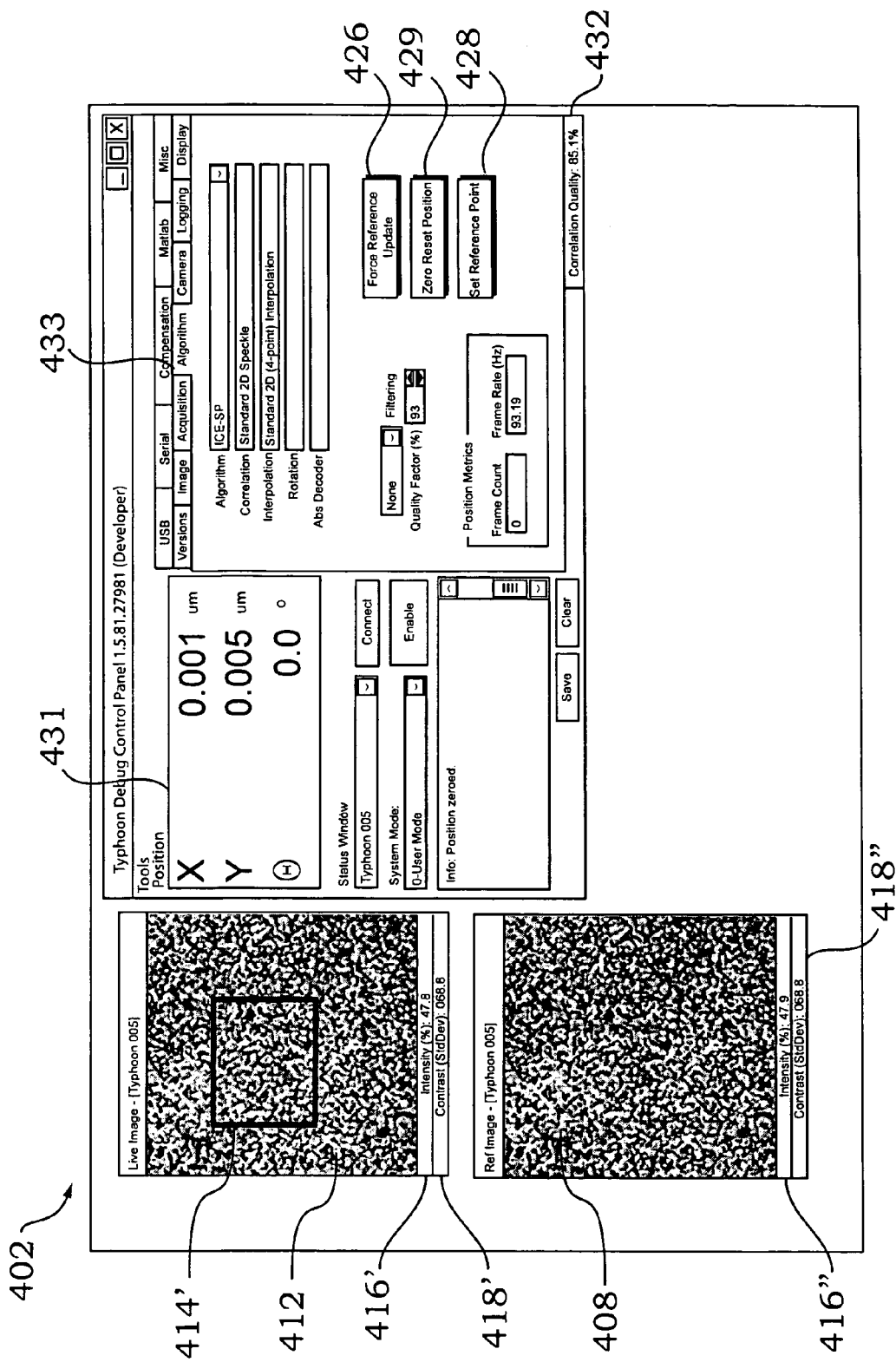
FIGS. 10-11 are additional screen shots illustrating additional features of the operator interface apparatus of FIG. 3.

FIG. 10 shows a screen shot 402 of a configuration that may include additional and alternative features and elements of the operator interface apparatus 400 that may be displayed on the display screen 410 shown in FIG. 3. The features shown in FIG. 10 may be particularly useful when an operator desires to troubleshoot or confirm transducer operation based on a previously selected pixel address window and/or a set of transducer operating parameters including image acquisition parameters. The operator interface apparatus 400 may include any convenient means for the operator to activate the features and/or functions shown in FIG. 10, for example, selection of a suitable control tab, such as the "Algorithm" tab 433, may activate the features. In this case, when the Algorithm tab 433 is activated, the operator interface apparatus 400 may operate to continuously perform correlation operations and determine displacements in a manner similar or identical to the normal operation of the displacement transducer, based on a continuously updated current live image, displayed as the acquired live image 412, and the latest (currently active) reference image, displayed as the reference image 408. The determined displacement may be displayed in a continuously updated position display area 431. The "Zero/

Reset Position" control button 429 may be activated to re-zero the displacement values shown in the position display area 431, and, in some embodiments, to update the reference image. Such a feature may be useful for troubleshooting or analyzing the presence of unwanted or unexpected displacement "drift", in the absence of actual displacement. Various applicable methods and design considerations related to determining a displacement based on correlation operations between a current image and a reference image are described below with reference to FIG. 12, and in the incorporated references.

As shown in FIG. 10, the screen shot 402 may also include a latest (currently active) pixel address window 414' superimposed on the acquired live image 412, and the associated average intensity 416' and contrast 418' figures of merit, which may be displayed at an alternative location in comparison to the figures of merit shown in FIG. 8. In this embodiment, the contrast 418' figure of merit may be the standard deviation of grayscale intensity values of the pixels included in the pixel address window. However, this choice of the contrast figure of merit is exemplary only and not limiting. The screen shot 402 may also include the latest (currently active) reference image 408 and its associated average intensity 416" and contrast 418" figures of merit. In the embodiment shown in FIG. 10, no pixel address window is shown on the reference image 408. However, in various other embodiments, the latest (currently active) pixel address window may be shown superimposed on the reference image 408.

Also shown in the screen shot 402, the operator interface apparatus 400 may also determine and display a "correlation quality" indicator 432. In the present case, the term Correlation Quality (CQ) may be analogous to an effective signal to noise (S/N) ratio for a correlation-type displacement transducer. The CQ may be derived from a correlation curve, which is a curve showing the amount of correlation between pixel points between two images, versus the displacement between the two images. The CQ may be generally higher when a correlation peak region of a correlation curve is relatively more narrow and its peak value $r_{extreme}$ is relatively more extreme, that is, lower in value for an absolute-value-of-the-difference (AVD) type of correlation function (or higher in value, depending on the type of correlation function used), compared to the noise level or average value of the correlation function. When the CQ is higher, the meaningful resolution and accuracy of a correlation type displacement measurement may generally be better. In one embodiment, the correlation quality CQ may be determined by analyzing the correlation value points in the vicinity of the peak of the correlation curve obtained by correlating the acquired live image with the current reference image at a number of pixel-increment offsets, according to the following equation:

$$CQ = 1 - \frac{r_{extreme}}{r_{avg}} \quad (2)$$

where $r_{avg}$ is defined by averaging the values of the set of five most extreme correlation points, including $r_{extreme}$. In such a case, a CQ value close to 1 may represent a better or lower AVD valley (the best or sharpest peak) and CQ=0 may indicate no valley (i.e., no correlation peak). For an analogous measure for a 2D correlation peak, a set of the 25 most extreme correlation points may be used. In general, a CQ of approximately 0.9 (90%) may be sufficient to obtain the highest levels of displacement accuracy and reliability for a variety of correlation displacement transducers. However, for purposes of troubleshooting and operating parameter adjustment, in many applications it may be sufficient to confirm that the correlation quality value exceeds a minimum desired value, for example 0.25, and/or remains relatively stable over an expected range of displacements. Various aspects of such a Correlation Quality indicator are described in additional detail in the previously incorporated '919 Application.

The operator interface 400 may also allow the operator to force the reference image to be updated or reset. By selecting the "Force Reference Update" command button 426, the operational reference image may be updated to be the same as the current live image. When this button is not activated, normal displacement determining operations may update the reference only after a certain displacement interval is exceeded, as described with reference to FIG. 11, below. The "Force Reference Update" command button 426 may override this normal type of operation, which may be useful for rapidly "re-initializing" this aspect of the transducer operation, and/or troubleshooting certain types of errors and operating problems. Also, by selecting the "Set Restore Point" command button 428, the current reference image may be stored in a memory of the operator interface apparatus 400, and/or in non-volatile memory in the displacement transducer system (such as the non-volatile memory 230 described below with reference to FIG. 13) so that the displacement transducer system may be powered off, and then restored to a previous state or position (a restore point) corresponding to the stored reference image.

Figure 11:
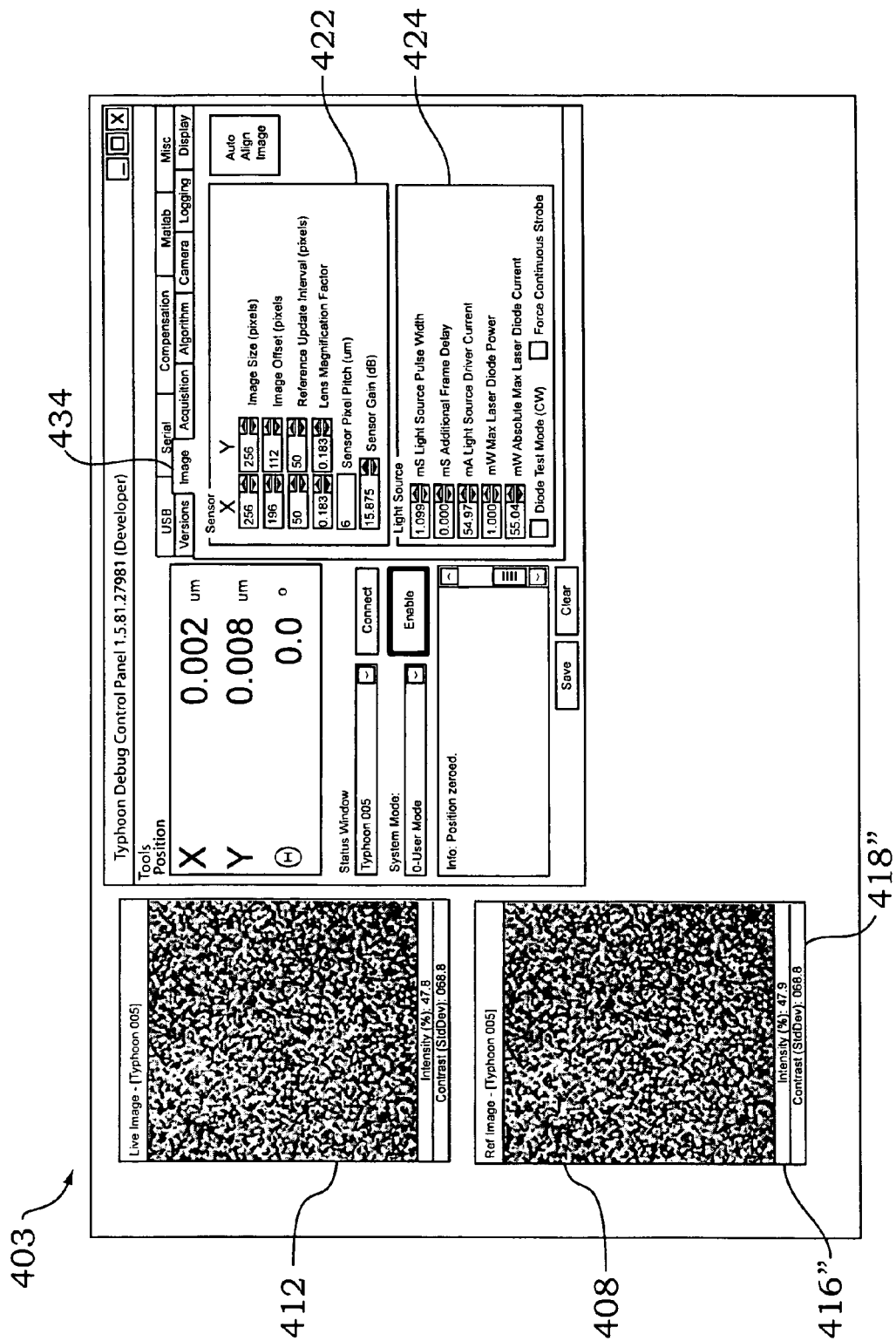

FIG. 11 shows a screen shot 403 of a configuration that includes additional and alternative features and elements of the operator interface apparatus 400 that may be displayed on the display screen 410 shown in FIG. 3. The features shown in FIG. 11 may be particularly useful when an operator desires to alter or troubleshoot a set of transducer operating parameters. In this case, when the "Image" tab 434 is activated, the operator interface apparatus 400 may operate to continuously display the acquired live image 412 and any desired figures of merit, and may display an exposure control panel 424 which allows an operator to adjust the system operating parameters that affect the image. Among the adjustable system operating parameters shown in the exposure control panel 424 may be a strobe light source pulse width (pulse duration), a frame delay, a light source driver current, maximum laser diode power, and maximum laser diode current, for example.

Also shown in FIG. 11, the operator interface apparatus 400 may display a "sensor" control panel 422 which allows an operator to adjust the system operating parameters that affect parameters related to the image acquisition. Among those options may be the size of the pixel address window (shown as "Image Size"), its nominal location (shown as "Image Offset"), the reference update interval, that is, the amount of image displacement that is allowed before the system automatically updates the reference image, and a lens magnification factor, which is used for converting between image displacement in pixels and transducer displacement, in microns, for example. In various applications, a relatively unskilled operator or purchaser of the surface displacement transducer 1 may not be allowed to adjust the pixel address window size, as it is generally set previously by skilled operators or factory personnel based on the design of the surface displacement transducer 1, depending on the design tolerance stackup and other surface displacement transducer 1 attributes.

The operating parameter values may be changed by selecting the adjacent "up" or "down" buttons shown in the panels 422 and 424, as well as typing in values, or by pointing to a location on the screen, or by drag and drop operations, for example. It should be understood that the operating parameter options displayed in FIG. 11 are exemplary only, and that numerous other options may also be offered in addition to, or instead of the options shown in FIG. 11, such as exposure time for each frame, integration time of the detector array 160, detector gain, and the like.

It should be understood that the various elements and/or screen displays shown in the screenshots 401-403, may generally be used repeatedly and in any order desired by an operator. The user may generally toggle between the various screen displays by selecting a desired control tab, exemplified by the control tabs 433-434, or the like, in order to observe and/or compare various aspects of operation or figures of merit, and/or alter various parameters, etc. Thus, using the features of the operator interface apparatus 400 described above, an operator or technician may intuitively or qualitatively choose the region in the image having the best or sufficient correlation characteristics, or the operator may rely on the calculated figures of merit and/or correlation quality, and the like, to choose the best candidate location for a pixel address window location, and/or preferred system operating parameters, and the like. When the operator is satisfied with their selection of the candidate location of the pixel address window and/or operating parameters, the relevant values and operating parameters may be stored in memory and used for subsequent surface displacement measurements, during normal operation of the transducer.

One exemplary method of operating an image correlation displacement transducer is outlined below, to provide a better understanding of the various operating parameters and set-up and calibration operations described above. Having determined the location of the pixel address window, the correlation calculation may proceed using the subset of pixels from the pixel correlation area. The pixel correlation area is typically one-half of the pixel address window, in order to maximize the range over which a measurement may be taken without updating the reference image. As described in the incorporated '705 Application, in various applications, using approximately 16,384 pixels, or a pixel correlation area of 128×128 pixels, may consistently yield a correlation measurement standard deviation of about 0.002 pixel pitches. Thus, for a pixel pitch corresponding to about 1 µm of displacement at the target surface, a correlation area of 128×128 pixels may generate a measurement with a standard deviation of about 2 nm. Furthermore, it is reasonably conservative to assume that an interval of five standard deviations will include substantially all of the actual correlation measurement values obtained by repeated measurement at a given position. Thus, a pixel correlation area of 128×128 pixels may be used, and an accurate and reliable measurement resolution of about 5*0.002 pixel pitches, or 0.01 pixel pitches, may be achieved. A pixel pitch corresponding to about 1 µm of displacement at the target surface, may reliably provide a measurement resolution of about 10 nm. Alternatively, the correlation area may contain between about 10000 and about 22500 pixels. More generally, the pixel correlation area is sized to provide the number of pixels required to provide the desired measurement resolution for any particular design or application, and a pixel correlation area having 256, or even 64 pixels, may be used.

Figure 12:
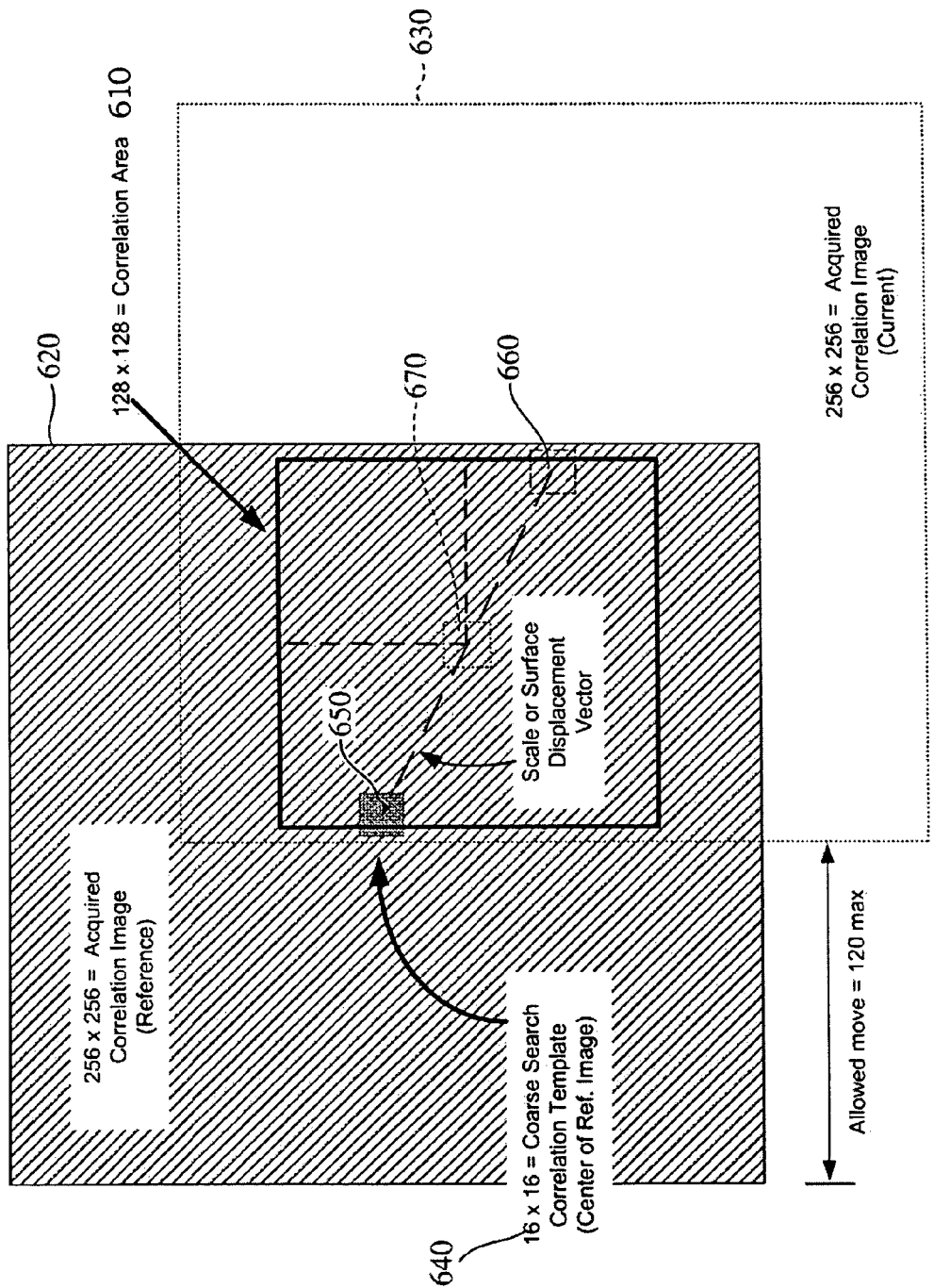
FIG. 12 illustrates a pixel correlation area inside a pixel address window, containing pixels that actually participate in the correlation calculation.

FIG. 12 is an illustration that clarifies various relationships between an exemplary 128×128 pixel correlation area and an exemplary 256×256 pixel address window, as well as illustrating one method of rapidly estimating an approximate correlation peak location based on the best correlation location of a relatively small coarse search template. In the example described here, as shown, the coarse search template 640 may be a 16×16 block of image pixels extracted from a set of known pixel addresses at the center of a reference image 620. As shown in FIG. 12, the reference image 620 may be a 256×256 pixel image previously acquired in an operative 256×256 pixel address window, which may have a location on the detector determined as previously described. Also shown is a current image 630 representing an image of a surface displaced relative to the reference image 620. The current image 630 may also be a 256×256 pixel image acquired in the operative 256×256 pixel address window.

In order to increase the rate at which the reference and current image are correlated, the 128×128 pixel correlation area 610 need not be used initially. Rather, the system may systematically step the 16×16 coarse search template 640 in one pixel increments throughout each location in the current image 630 and determine a correlation value at each location. This operation may be performed rapidly due to the small size of the coarse search template 640. The location of the peak correlation value for the coarse search template in the current image may then be determined by the system using methods taught in incorporated references or by any other suitable now known, or later developed method.

With reference to FIG. 12, it should be appreciated that if there were no surface displacement between a reference and a current image, because the coarse search template was extracted from the center of the reference image 620, the location of the peak correlation value for the coarse search template would likewise be in the center of the current image 630, as indicated by location 660 shown at the center of the current image. However, for the example shown in FIG. 12, the location of the peak correlation value for the coarse search template in the current image is near the edge of the current image at the location 650. Thus, it is apparent that the imaged surface has been displaced by an amount approximately corresponding to the surface displacement vector shown in FIG. 12. The surface displacement vector may readily be determined based on the location of the peak correlation value in the current image and the location of the set of known pixel addresses from which the coarse search template was extracted in the reference image, according to known methods.

As indicated in FIG. 12, the respective portions of the reference image 620 and the current image 630 that may best correlate, that is, the respective portions of the reference image 620 and the current image 630 that image the same portion of the surface, may be those respective portions of the reference image 620 and the current image 630 that are approximately congruent with the 128×128 pixel correlation area 610 centered at the location at the midpoint 670 of the surface displacement vector. Thus, the precise displacement measurement determinations based on correlating the full 128×128 pixel correlation area, may start with initial pixel address offset values corresponding to these respective portions of the reference and current images, and need only search in a limited range around these initial pixel address offset values in order to determine the location of the 128×128 peak correlation value according to methods disclosed in incorporated references, or any other now known, or later developed, method. Thus, based on the foregoing sequence of approximate, and then precise, correlation determinations, the overall full-precision correlation-based displacement measurements may be performed at a high rate. Commonly assigned U.S. patent applications Ser. Nos. 09/921,889 and 09/921,711 disclose other methods for performing approximate, and then precise, correlation determinations such that the overall full-precision correlation-based displacement measurements may be performed at a high rate, and they are hereby incorporated by reference in their entirety, for all of their relevant teachings. However, simpler, more conventional, exhaustive high-precision correlation search methods may be employed when the correlation-based displacement measurements need not be performed at a high rate, or when a conventionally imaged absolute code scale is used, or the like.

The size of the pixel correlation area 610 may be, in the example shown in FIG. 12, one-half of the size of the pixel address window 620. Therefore, this minimum size (minus one-half of the 16×16 coarse search template=8 pixels) may determine the maximum amount of surface displacement which can be tolerated between the first stored reference image 620 and the second stored current image 630. Therefore, as shown in FIG. 12, the reference image 620 and the current image 630 may be separated by no more than a distance corresponding to one-half of the pixel address window 620 minus 8 pixels for the coarse search template, which is 120 pixels. This requirement may set an upper bound on the displacement range which may be measured without updating the reference image, or the maximum allowed speed of the surface 110 beneath the readhead, times the sample time interval. For example, if the pixel pitch is 1 μm and the magnification is 1, the range or maximum amount of surface displacement allowed between the first stored reference image 620 and the second stored image 630 may be 120 μm. However, more generally, it should be appreciated that the range in terms of surface displacement may be reduced in proportion to the magnification with which the target surface is imaged onto the surface of the detector array 160.

Once the initial pixel address offset value is known, the full correlation calculation may be performed using the entire 128×128 pixel correlation area. The peak profile of the correlation peak may then be analyzed to provide an interpolated, sub-pixel estimate of the image offset between the live or current image and the reference image, which may then be converted to the displacement value displayed by the operator interface apparatus 400 in the position display area 431, and/or output to a host system during normal operation.

Figure 13:
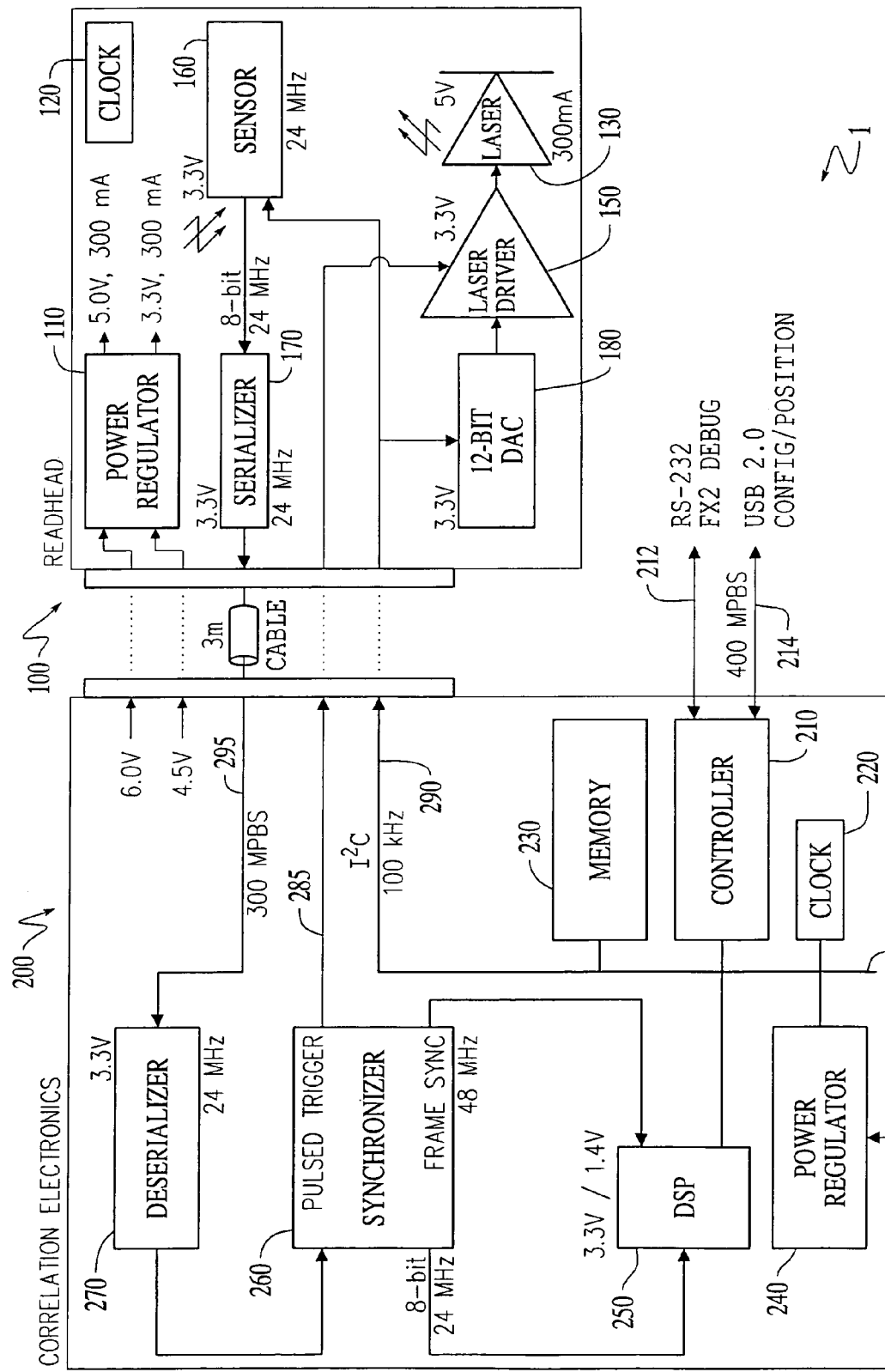
FIG. 13 is an exemplary block diagram illustrating additional details of the signal generating and processing circuitry and readhead shown in FIGS. 1 and 2.

FIG. 13 is a block diagram outlining in greater detail one exemplary embodiment of the signal generating and processing circuitry 200 and readhead 100 shown in FIGS. 1 and 2. As shown in FIG. 13, the signal generating and processing circuitry 200 may include a controller 210, a system clock 220, a non-volatile memory 230, a power regulator 240, a digital signal processor (DSP) 250, a synchronizer 260, and a deserializer 270. The digital signal processor 250 may be, for example, a TMS320C6414 DSP, manufactured by Texas Instruments of Dallas, Tex. The controller 210 may be, for example, a CY7C68013 EZ-USB FX2 microcontroller, manufactured by Cypress Semiconductor of San Jose, Calif. The readhead electronics 100 may include a power regulator 110, a clock 120, the sensor array 160, the laser light source 130, the laser light source driver 150, a digital-to-analog converter 180, and a serializer 170.

The signal generating and processing circuitry 200 may be applied either to a speckle-image displacement correlation sensor, or to an absolute displacement transducer. The following description applies to a speckle-image displacement correlation transducer, using a coherent laser light source.

The light source 130 may be triggered by a pulse signal originating from the synchronizer 260. Upon receiving the pulse signal, the light source may be activated to illuminate the surface 110 with light. Light reflected from surface 110 may be detected by the detector array 160. The amplitude of the detected light may be measured by the output of the pixels of the detector array 160, whose data are output in 24 MHz, 8-bit parallel fashion. The controller 210 may output a signal directing the digital signal processor 250 to acquire data from only those image pixel addresses defined in the pixel address window during normal operation, or to acquire data from all pixels in the detector array 160, during the calibration and setup routine described above.

The controller 210 may be connected to the light source driver 150 by a signal line 290, via the digital-to-analog converter 160. The controller 210 may thereby send signals to the light source driver 150 to either increase or decrease the current supplied to the laser light source 130, by sending the appropriate digital signal to the digital-to-analog converter 180. The digital-to-analog converter may then apply a signal of the appropriate amplitude to the light source driver 150, which applies the current to the light source 130. The light source driver 150 may be triggered by a signal on signal line 285, which may be the pulse signal originating from the synchronizer 260. The synchronizer 260 may generate the pulse signal when the synchronizer detects that an entire frame of pixel data has been received from the detector array 160 to synchronizer 260.

The 8-bit parallel data may be transmitted to the serializer 170, which may serialize the data into 300 Mbps serial data and transmit the data over a 3 m cable to the deserializer 270 in the signal generating and processing circuitry 200. The deserializer 270 may then deserialize the data into 8-bit parallel, 24 MHz signal which is transmitted to the digital signal processor 250. The synchronizer 270 may also put out a frame synch signal which keeps the digital signal processor 250 synchronized with the detector array 160. An image may be acquired from the detector array 160 by the digital signal processor 250, and stored in the internal memory of the digital signal processor 250. The image data acquired by the digital signal processor 250 may be either reference image data or current image data. In either case, the image data may be stored in internal memory of the digital signal processor, at least while the signal generating and processing circuitry 200 is powered, as well as transferred to the controller 210, for transmission to the operator interface apparatus 400, where image data may be stored and retained as long as needed for any of the operations of the operator interface apparatus 400.

The definition of the pixel address window by the algorithms described above, is based on acquiring an image over a complete set of pixel data covering the entire field of view of the detector of the surface displacement transducer. This complete set of pixel data is analyzed to determine a desirable pixel address window.

After a new current image is acquired according to the foregoing procedures and is stored in the current image portion of the internal memory of the digital signal processor 250, the current obtained image is output to the controller 210. The current image may then be transmitted to the operator interface apparatus 400 and displayed on display 410 by of the operator interface apparatus 400. The current image may also be stored as the new reference image, and subsequent live images correlated to the stored reference image. The digital signal processor 250 correlates and interpolates the current image with the reference image, and outputs the processed images and the measured position to the controller 210.

The digital signal processor 250 may perform the appropriate correlation and interpolation techniques outlined above. In particular, the digital signal processor 250 may extract and compare the image value for each of the image elements 162 from the current image portion to the corresponding image value stored in the reference image portion, apply the correlation technique and output the comparison result. The outputted value may define the correlation value, corresponding to the current 2D, or X or Y, offset, in predetermined units. The digital signal processor 250 may then store the comparison result corresponding to the current 2D, or X or Y, offset.

Once all of the comparisons for all of the desired offsets between the current image stored in the current image portion and the reference image stored in the reference image portion have been performed by the digital signal processor 250, the digital signal processor 250 may begin the interpolation algorithm to interpolate the correlation function to determine the peak offset value or image displacement value with sub-pixel resolution in the X and Y directions. The digital signal processor 250 then outputs the determined subpixel resolution measurement value to the controller 210, which transmits the measurement to the operator interface apparatus 400.

To perform the interpolation, the digital signal processor 250 uses any known or later developed technique, such as any one of the techniques disclosed in U.S. patent application Ser. No. 09/731,671 incorporated herein by reference in its entirety, to find the actual location of the selected peak of the correlation results to a subpixel resolution.

Figure 14:
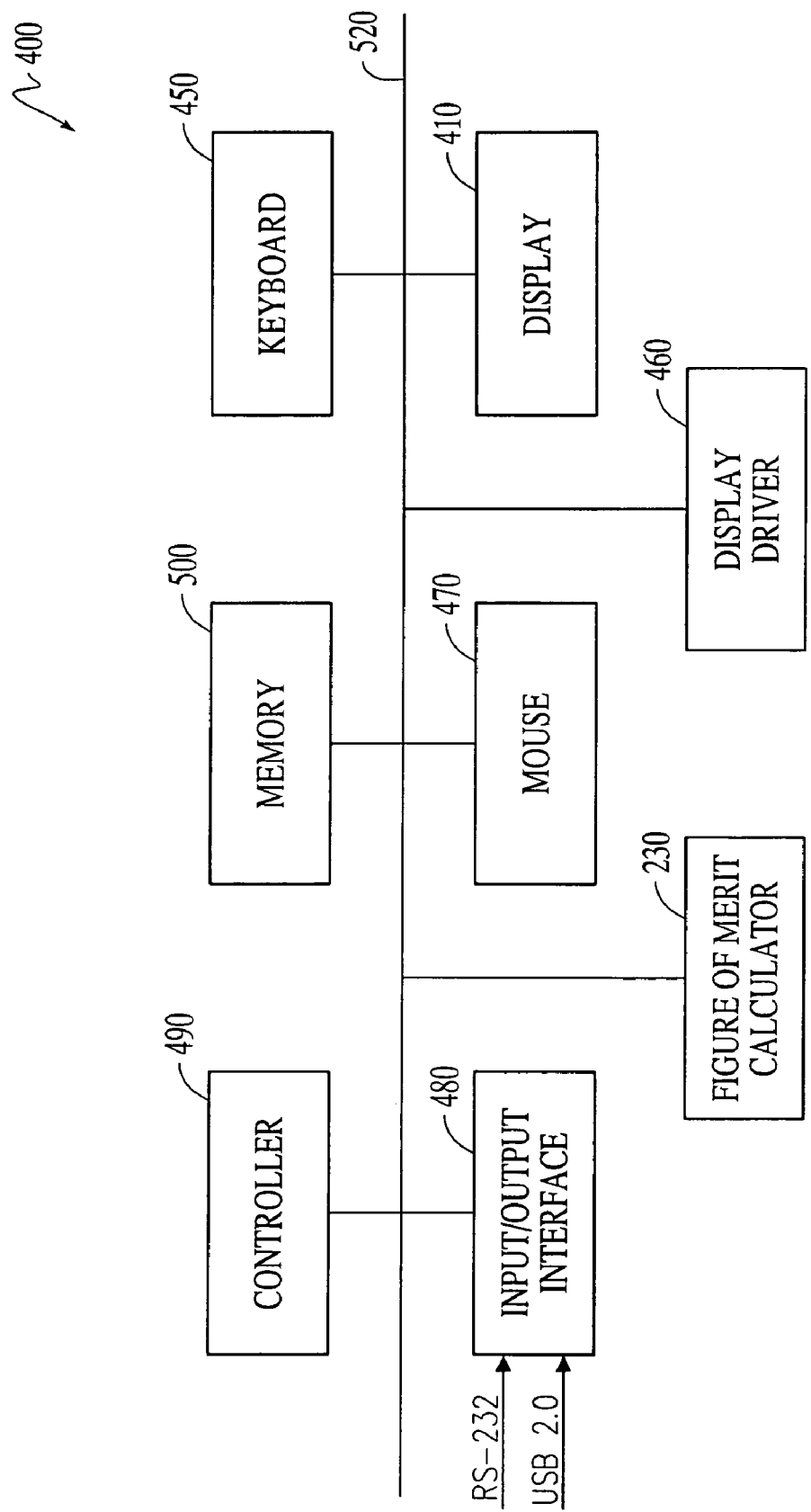
FIG. 14 is an exemplary block diagram of an operator interface apparatus in communication with the hardware of FIG. 13.

FIG. 14 is a block diagram of an exemplary operator interface apparatus 400, usable with the above described surface displacement transducer 1, shown in FIG. 13. The operator interface apparatus 400 may include a display 410, display driver 460, a mouse 440, a figure of merit calculator 470, an input/output interface 480, a controller 490, a memory 500, and a keyboard 450. The devices 460-500 may be coupled on a bus 520, or they may form portions of an application-specific integrated circuit (ASIC). It should be understood that operator interface apparatus 400 may also be embodied in a personal computer. More generally, any device capable of implementing a finite state machine that is in turn capable of implementing the various features of the apparatus and/or methods described above may be used to provide the operator interface apparatus 400 and the associated methods.

During start up of the operator interface apparatus 400, and as needed thereafter, the controller 210 of surface displacement transducer 1 may output various system operating parameters available from the non-volatile memory 230, over a signal line 212 and/or 214 to the input/output interface 480 of operator interface apparatus 400 shown in FIG. 14. The input operating parameters may provide various parameters for the operation and displayed values of the operator interface apparatus 400, or may be used to update or replace default parameters initially provided from the memory 500 of the operator interface apparatus 400. The controller 210 of surface displacement transducer 1 may also output a determined position measurement over the signal line 212 and/or 214 to the input/output interface 480 of operator interface apparatus 400 shown in FIG. 14. The controller 210 may also output the current image data from current image portion of internal memory of the digital signal processor 250, as well as reference image data from reference image portion of internal memory of the digital signal processor 250, for storage in the memory 500 and/or display by the display 410 and/or use in the various calculations or other operations performed by the operator interface apparatus 400, as needed. The images may be updated in the operator interface apparatus 400 whenever they are updated in the surface displacement transducer 1. If desired, the current (last) reference image may be saved in the memory 500, such that the reference image may be recalled and/or downloaded to the surface displacement transducer 1 at a later time, for example, after a power interruption, to provide a reference image that allows the surface displacement transducer 1 to be repositioned at a precise location corresponding to that reference image. The controller 210 may output the position measurement over the RS-232 data bus 212 shown in FIG. 13, and the image data over the USB 2.0 data bus 214 shown in FIG. 13. Using the exemplary commercial components described previously, for example, the controller 210 may output the image data at a 50 Hz frame rate, and the position measurement at a 100 Hz rate. However, more generally, the rates are limited only by the capabilities of the components used in any particular embodiment. The display driver 460 may drive a display 410 to display the image data and the position measurement.

Two or more signal lines 212 and 214 therefore may couple the operator interface apparatus 400 with the surface displacement transducer 1. The operator interface apparatus 400 may accept operator input regarding the location of the candidate pixel address window via the mouse 440 or the keyboard 450. The operator interface apparatus 400 may send the inputted values to the surface displacement transducer 1 via the RS-232 data bus 212, or the USB 2.0 data bus 214. As a result of a selection of a new candidate pixel address window, the surface displacement transducer may be configured to acquire only that subset of pixels from the detector array 160, thereby greatly increasing the measurement speed of the device.

The operator interface apparatus 400 may also be used to configure the surface displacement transducer 1 in other ways. For example, referring to FIG. 11, the various options offered to the operator for choosing parameters which affect the image, may be input to the interface using interface apparatus 400. Interface apparatus 400 then transmits the chosen values to the controller 210 of the signal generating and processing circuitry 200, which then implements the chosen values when acquiring a next image. For example, the operator interface 400 can also be used, in combination with the controller 210, light source driver 150 and digital-to-analog converter 180, to control the operating conditions of the light source 130. For example, if the operator chooses to increase the light source driver current on panel 424 of screen 403, the controller 210 will transmit the command to the digital-to-analog converter 180, which may then generate the appropriate analog signal and transmit it to the light source driver 150, as described above with reference to FIG. 13.

The operator interface 400 may accept input from an operator via either mouse 440 or keyboard 450. The mouse 440 may be used either to locate a position of the pixel address window by pointing to a location on the display 410, or to select any of a number of buttons on the operator interface screens 401-404.

While various exemplary embodiments have been illustrated and described, a wide variety of pixel address window sizes, pixel correlation area sizes and criteria for the selection of the pixel address window exists. Although various operations and features have been described with reference to a speckle optical displacement transducer or an absolute optical displacement transducer, the various operations and features described in relation to the embodiments herein may just as well be applied in various combinations with other detectors and transducers. Many of the options described as being available on the operator interface apparatus are exemplary only, and it should be understood that any of a number of other options may be offered instead of, or in addition to, the options described herein. Various modification and substitutions or the like are possible within the spirit and scope of the invention.

What is claimed is:

1. An apparatus for controlling a surface displacement transducer, wherein the surface displacement transducer comprises:

signal generating and processing circuitry including a memory;

a light source arranged to direct a beam of light onto a target surface; and a detector configured to obtain an image of a beam spot produced by reflecting the beam of light from the target surface onto the detector, the detector including a number of pixels greater than a subset of pixels which participates in a surface displacement calculation of the surface displacement transducer, and the apparatus comprises:

an input device that is configured to allows an operator to select at least one candidate location of the subset of pixels of the detector which participate in the surface displacement calculation of the surface displacement transducer, the input device comprising at least one of a mouse, a pointer, a joystick and a keyboard;

a display that displays an image obtained by the surface displacement transducer, and at least one selected candidate location of the subset of pixels; and a first controller which is configured to operate the apparatus to:

command the surface displacement transducer to direct the beam of light onto the target surface and obtain an image of the beam spot produced by reflecting the beam of light from the target surface onto the detector;

display the obtained image and at least one selected candidate location of the subset of pixels on the display;

calculates at least one figure of merit associated with each selected candidate location of the subset of pixels;

determine a location for the subset of pixels based at least partially on at least one figure of merit associated with the at least one selected candidate location for the subset of the pixels; and command the signal generating and processing circuitry to store the determined location for the subset of pixels in the memory.

2. The apparatus of claim 1, wherein the figure of merit is based on at least one of image intensity, image uniformity, image contrast, correlation quality, image illumination and image exposure.

3. The apparatus of claim 2, wherein the figure of merit is based on pixel values within a plurality of groups of four nearest-neighbor pixels that are included in the subset.

4. The apparatus of claim 1, wherein the input device also allows the operator to select at least one of a maximum displacement allowed before updating a reference image and a time interval before updating the reference image.

5. The apparatus of claim 1, wherein the controller selects a first location for the subset of pixels based on a comparison of at least one figure of merit for each of a plurality of candidate locations.

6. The apparatus of claim 1, wherein the display displays the calculated at least one figure of merit associated with each location of the subset of pixels.

7. The apparatus of claim 1, wherein the surface displacement transducer comprises at least one of an absolute surface displacement transducer wherein the target surface comprises a scale pattern indicative of displacement, and the light source is an incoherent light source, and a speckle displacement transducer wherein the target surface comprises a light-dispersive surface and the light source is a cohenent light source.

8. The apparatus of claim 1, wherein the subset of pixels includes at most about 70% of the pixels of the detector.

9. The apparatus of claim 1, wherein the subset of pixels is a 256 row ×256 column set of pixels.

10. The apparatus of claim 1, wherein the input device allows the operator to enter one or more operating parameters for at least one of light source control and image exposure control of the surface displacement transducer.

11. The apparatus of claim 1, wherein the input device also allows an operator to select contents of a data packet output by the surface displacement transducer.

12. The apparatus of claim 1, further comprising at least one of an RS-232 serial connection and a USB connection.

13. A system comprising:

the apparatus of claim 1;

and the surface displacement transducer, wherein the signal generating and processing circuitry comprises a digital signal processor and a second controller.

14. A method for measuring a surface displacement with a surface displacement transducer, comprising:

directing a beam of light from a light source onto a target surface;

reflecting the beam from the target surface and into a beam spot on a detector, the detector including a number of pixels greater than a subset of pixels which participates in a surface displacement calculation;

determining at least one candidate location for the subset of pixels, wherein determining the at least one candidate location comprises an operator selecting a candidate location using an input device comprising at least one of a mouse, a pointer, a joystick and a keyboard to provide input to an operator interface apparatus that is connected to the surface displacement transducer;

determining a location of the subset of pixels based at least partially on at least one figure of merit associated with the at least one candidate location for the subset of the pixels; and storing the location of the subset of pixels.

15. The method of claim 14, further comprising:

the operator selecting at least a second candidate location for the subset of pixels by using the input device to provide input to the operator interface apparatus;

determining at least one figure of merit for the second candidate location; and storing the location of the subset of pixels which participate in the surface displacement calculation to be the second candidate location; and measuring a surface displacement based on the subset of pixels.

16. The method of claim 14, wherein the figure of merit includes at least one of image intensity, image uniformity, image contrast, correlation quality, image illumination and image exposure.

17. The method of claim 14, further comprising:

displaying at least one of a reference image and a live image; and displaying at least one candidate location selected by the operator for the subset of pixels in at least one of the reference image and the live image.

18. The method of claim 17, further comprising:

displaying the at least one figure of merit associated with the displayed at least one candidate location selected by the operator.

19. The method of claim 18, further comprising:

displaying the second candidate location of the subset of pixels; and displaying the at least one determined figure of merit associated with the second candidate location.

20. The method of claim 17, further comprising:

displaying at least one parameter that determines a quality of an image;

inputting a parameter value for at least one parameter that determines a quality of the image; and obtaining the image based on the parameter value.

21. The method of claim 20, wherein the parameter is at least one of light source control and image exposure control.

22. The method of claim 15, further comprising:

displaying the surface displacement measurement.

23. The method of claim 14, further comprising:

inputting a parameter value for at least one parameter that determines an interval at which a reference image is updated when operating the surface displacement transducer; and displaying the at least one parameter.

24. The method of claim 23, wherein the interval is at least one of a time interval and a displacement interval.

25. The method of claim 14, further comprising:

displaying contents of a data packet to be transmitted from the surface displacement transducer;

inputting a selection of the contents of the data packet; and transmitting the selected contents from the surface displacement transducer.

26. An apparatus for measuring a surface displacement with a surface displacement transducer, comprising:

means for directing a beam of light from a light source onto a target surface;

means for reflecting the beam from the target surface and into a beam spot on a detector, the detector including a number of pixels larger than a subset of pixels which participates in a surface displacement calculation;

means for determining at least one candidate location for the subset of pixels, wherein the means for determining the at least one candidate location comprises at least one of a mouse, a pointer, a joystick and a keyboard included in an interface apparatus that is connected to the surface displacement transducer and that is usable by an operator to select a candidate location;

means for determining a location for the subset of pixels based at least partially on at least one figure of merit associated with the at least one candidate location for the subset of the pixels; and means for storing the location of the subset of pixels.

27. The apparatus of claim 26, wherein the detector includes a number of pixels at least 40% larger than the subset which participates in a surface displacement calculation.

* * * * *